United States Patent
Uruta et al.

(10) Patent No.: US 8,300,260 B2
(45) Date of Patent: Oct. 30, 2012

(54) IMAGE FORMING APPARATUS, PRINT CONTROL METHOD, AND COMPUTER-READABLE RECORDING MEDIUM STORING PRINT CONTROL PROGRAM

(75) Inventors: Hiroya Uruta, Tokyo (JP); Takanori Fujii, Kanagawa (JP); Tetsuo Asakawa, Tokyo (JP); Eijiro Inoue, Kanagawa (JP); Akihiro Kakoi, Kanagawa (JP); Yoshinori Furuichi, Kanagawa (JP); Kazuya Ezura, Kanagawa (JP); Yoshihiro Ogura, Kanagawa (JP); Yoshiaki Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 931 days.

(21) Appl. No.: 12/320,219

(22) Filed: Jan. 22, 2009

(65) Prior Publication Data
US 2009/0190147 A1 Jul. 30, 2009

(30) Foreign Application Priority Data
Jan. 22, 2008 (JP) ................................ 2008-012015

(51) Int. Cl.
*G06K 15/00* (2006.01)
*G06F 3/12* (2006.01)
(52) U.S. Cl. ....... 358/1.16; 358/1.2; 358/1.15; 358/1.14
(58) Field of Classification Search ..................... None
See application file for complete search history.

(56) References Cited

U.S. PATENT DOCUMENTS

| 5,297,876 | A | * | 3/1994 | Imagawa ................... 400/61 |
| 2006/0055975 | A1 | | 3/2006 | Toda |
| 2007/0121161 | A1 | * | 5/2007 | Yamada ................... 358/1.16 |
| 2007/0127050 | A1 | | 6/2007 | Iwata et al. |
| 2007/0150682 | A1 | | 6/2007 | Ogasawara et al. |
| 2007/0214494 | A1 | | 9/2007 | Uruta et al. |
| 2008/0141167 | A1 | | 6/2008 | Kubo et al. |
| 2008/0180743 | A1 | | 7/2008 | Uruta et al. |

FOREIGN PATENT DOCUMENTS

| JP | 2002-351632 | 12/2002 |
| JP | 2005-193394 | 7/2005 |
| JP | 2006-076215 | 3/2006 |
| JP | 2006-159702 | 6/2006 |
| JP | 2006-319788 | 11/2006 |

OTHER PUBLICATIONS

Office Action mailed Jun. 19, 2012 for corresponding Japanese Patent Application No. 2008-012015.

* cited by examiner

*Primary Examiner* — Dov Popovici
(74) *Attorney, Agent, or Firm* — Harness, Dickey & Pierce, P.L.C.

(57) ABSTRACT

An image forming apparatus and a print control method prevents a disadvantageous effect to a user due to print failure, before an image forming operation is started. The image forming apparatus includes an interface for connecting an external storage device to the image forming apparatus. Data stored in the external storage device is read via the interface and printed by the image forming apparatus. A memory usage at the time of printing the data is calculated based on a parameter obtained from various information about the data. The calculated memory usage and a memory capacity that is available in the image forming apparatus during printing are compared. An image forming operation for printing the data is controlled depending on a comparison result.

12 Claims, 15 Drawing Sheets

FIG.14

| PRIORITY | PRINT METHOD |
|---|---|
| 2 | LOSSY COMPRESSION IMAGE METHOD |
| 1 | WORK MEMORY EXPANDING METHOD |
| 3 | LOWER RESOLUTION IMAGE METHOD |
| ... | ... |

52

IMAGE FORMING APPARATUS, PRINT CONTROL METHOD, AND COMPUTER-READABLE RECORDING MEDIUM STORING PRINT CONTROL PROGRAM

BACKGROUND OF THE INVENTION

1. Field of the Invention

The present invention generally relates to image forming apparatuses and print control methods for printing data stored in an external storage device. The invention also relates to computer-readable recording media in which a print control program is recorded.

2. Description of the Related Art

While conventionally data is often printed on an image forming apparatus via a personal computer (PC), the data storage capacity of external storage devices has greatly increased in recent years. Improvements have also been made in technologies for realizing enhanced portability (i.e., smaller size). As a result, there is an increasing demand to connect an external storage device to the image forming apparatus so that data stored in the external storage device can be directly printed by the image forming apparatus.

For example, there is a printing apparatus with a predetermined slot into which a Universal Serial Bus (USB) memory with stored image data or the like can be inserted. In the image forming apparatus, the data from the USB memory can be printed via an external storage device interface (I/F).

Against this technical background, users demand increasingly greater size of data to be printed. However, memory capacity differs depending on the type of image forming apparatus, with the smaller and less expensive types having smaller memory capacity.

One of the problems of the related art is that a lack of memory ("memory overflow") may occur depending on the kind of data to be printed, whereby the functions of an image forming apparatus cannot be fully exploited. In an image forming apparatus, during an image forming operation, image data (intermediate data) that can be interpreted by a printer engine (hereafter referred to as an "engine") is generated from print data. The image data thus generated is retained in a memory. If sufficient free space (available memory area) to retain the generated image data is not available in the memory, a print failure may be caused.

Japanese Laid-Open Patent Application No. 2006-159702 (Patent Document 1) discloses an image processing apparatus in which a print buffer is monitored. Upon detection of a buffer-full status, an image forming method is selected that requires less image data to be written in the buffer.

However, in this technology according to Patent Document 1, whether there is a lack of memory or not cannot be determined until, for example, all of the print data transmitted from a PC is received by the image processing apparatus and image data that can be interpreted by the engine is generated from the received data and then written in the buffer area that is available in the provided memory at the time of printing.

Thus, in the conventional technology, a potential print failure is determined in the course of a normal image forming operation involving the reception of data from a PC, generation of proper image data, writing in the buffer area, and the like. Consequently, upon detection of a fault due to lack of memory, the time spent for the preceding image forming operation is wasted. In addition, in order to grasp the overall picture of the print data to verify the development of print failure, the entire data needs to be received by the image processing apparatus, so that it takes a long time when the size of the received data is large.

SUMMARY OF THE INVENTION

It is a general object of the present invention to provide an image forming apparatus, a print control method, and a computer-readable recording medium in which a print control program is recorded, whereby one or more of the aforementioned problems of the related art are eliminated.

A more specific object is to provide an image forming apparatus, a print control method, and a computer-readable recording medium in which a print control program is recorded, whereby prior to starting an image forming operation (i.e., before image data that can be interpreted by an engine is generated), a potential print failure can be detected so that a disadvantageous effect to the user (such as the production of an incompletely printed sheet) due to a print failure can be prevented.

According to one aspect of the present invention, an image forming apparatus includes an interface for connecting an external storage device with the image forming apparatus in order to read and print data stored in the external storage device via the interface.

The image forming apparatus further includes an acquisition unit configured to acquire a parameter for calculating a memory usage at the time of printing the data from information about the data; a calculation unit configured to calculate the memory usage based on the parameter acquired by the acquisition unit and according to a predetermined calculating formula; and a control unit configured to compare the memory usage calculated by the calculation unit and an available memory capacity in the image forming apparatus at the time of printing. The control unit controls an image forming operation during printing depending on a comparison result.

In a preferred embodiment, the image forming apparatus may include a coefficient retaining unit configured to retain a coefficient value for the calculation of the memory usage, in association with each file type. The coefficient value characterizes the memory usage during printing on a per-page basis for a file type.

In order to calculate the memory usage, the calculation unit acquires, from the coefficient retaining unit, the coefficient value associated with the file type for calculating the memory usage, based on information indicating the file type of the parameter acquired by the acquisition unit. The calculation unit then substitutes the acquired coefficient value for calculating the memory usage into the predetermined calculating formula.

In another preferred embodiment, the control unit may control the image forming operation so that, depending on the comparison result, the image forming operation is controlled by one of a plurality of print methods that is determined based on a predetermined rule print.

According to another aspect of the present invention, there is provided a print control method for reading data stored in an external storage device and printing the data using an image forming apparatus having an interface for connecting the external storage device with the image forming apparatus.

The method includes an acquiring step of acquiring from information about the data a parameter for calculating a memory usage at a time of printing the data; a calculating step of calculating the memory usage based on the parameter acquired in the acquiring step and in accordance with the predetermined calculating formula; and a control step of comparing the memory usage calculated in the calculating step with a memory capacity available in the image forming apparatus during printing, and controlling an image forming operation during printing based on a comparison result.

According to another aspect, there is provided a computer-readable recording medium storing a print control program for reading data stored in an external storage device and printing the data using an image forming apparatus having an interface for connecting the external storage device with the image forming apparatus.

Execution of the computer-readable program by one or more processors of an information processing apparatus causes the one or more processors to perform an acquiring step of acquiring from information about the data a parameter for calculating a memory usage at a time of printing the data; a calculating step of calculating the memory usage based on the parameter acquired in the acquiring step and in accordance with the predetermined calculating formula; and a control step of comparing the memory usage calculated in the calculating step with a memory capacity available in the image forming apparatus during printing, and controlling an image forming operation during printing based on a comparison result.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 14 shows an example of priority management data for selecting a print control method according to Embodiment 2.

DETAILED DESCRIPTION OF THE PREFERRED EMBODIMENTS

Hereafter, preferred embodiments of the present invention are described with reference to the drawings.

Embodiment 1

Printing of Data Stored in External Storage Device

Figure 1:
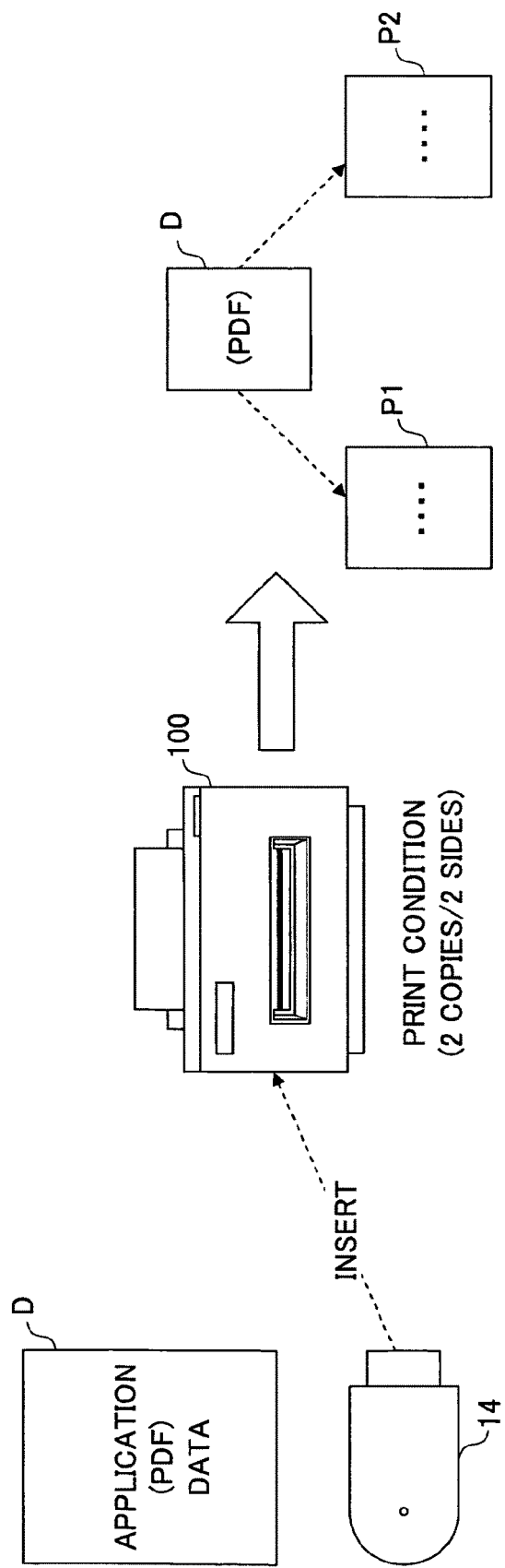
FIG. 1 schematically illustrates a process of printing data stored in an external storage device according to Embodiment 1 of the present invention.

With reference to FIG. 1, a description is given of a process of directly printing from an external storage device according to Embodiment 1. In this process, data D stored in an external storage device 14 is printed using an image forming apparatus 100.

A user connects the external storage device 14 storing the data D to the image forming apparatus 100. The data D may be generated by various applications installed on a PC of the user. The data D may include Portable Document Format (PDF) data. The external storage device 14 is configured so that data can be erased from or written into the device freely, and so that the written data can be retained in a nonvolatile manner. The external storage device 14 may include a semiconductor memory, such as a USB memory.

Upon detection of connection of the external storage device 14 to the image forming apparatus 100, information about the data stored in the external storage device 14, such as file names, is acquired and displayed on a display screen 21 of an operating panel 11, for example, of the image forming apparatus 100.

The image forming apparatus 100 is capable of directly printing predetermined application data. The image forming apparatus 100 includes a display function and a user interface ("UI") function, both of which may be provided via an operating panel 11 shown in FIG. 2.

Figure 2:
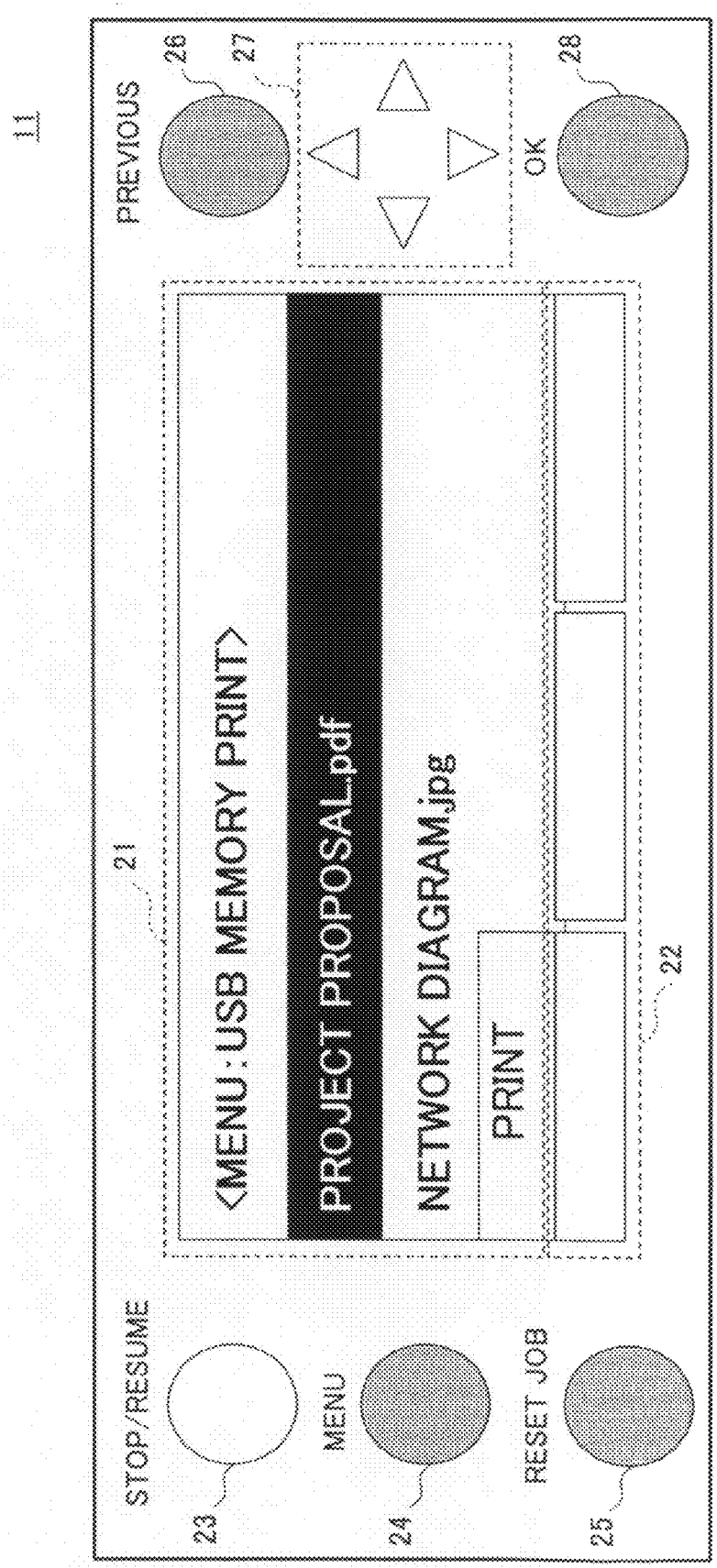
FIG. 2 shows an operating panel of an image forming apparatus according to Embodiment 1.

With reference to FIG. 2, the display screen 21 shows the names of two of the files stored in the external storage device 14 by way of example. As mentioned above, the operating panel 11 provides the UI function to the user. The UI function may be provided by the display screen 21; a function selection key 22; a print stop/resume key 23; a menu key 24; a job reset key 25; a "Previous" key 26; an arrow key 27; and an OK key 28.

The display screen 21 displays various information relating to an image forming operation, such as print conditions. The function selection key 22 is configured to allow the selection of an operation function, such as the print function, of the image forming apparatus 100. The print stop/resume key 23 is used when a print operation needs to be paused or resumed. The menu key 24 is used when requesting a menu screen display for entering operation settings for the various functions of the image forming apparatus 100. The job reset key 25 is used when cancelling a print job being performed. The "Previous" key 26 is used when transitioning to a previous information item displayed on the menu screen. The arrow key 27 is used when moving from one item of information to another on the menu screen. The OK key 28 is used when selecting an information item displayed on the menu screen.

Thus, a user can operate the image forming apparatus 100 via the UI function in dialog form. For example, when selecting particular print data to be printed from the data D from the external storage device 14, or entering an instruction to print the selected data, the user makes use of the aforementioned UI function. In FIG. 2, "project proposal.pdf" is selected as print data. Thus, the user selects print data via the UI function on the operating panel 11.

Thereafter, the image forming apparatus 100 acquires a file for the data D selected by the user from the external storage device 14, and displays one or more print conditions that may be set for data D on the display screen 21 of the operating panel 11 again. The user, after confirming the displayed print conditions, enters an instruction for printing the data D via the UI function (such as by pressing the function selection key 22 shown in FIG. 2).

The image forming apparatus 100 thus receives the print request from the user and prints the data D in accordance with the print conditions. For example, in the case of FIG. 1, because the print condition "2 copies/2 sides" is set for the data D, the image forming apparatus 100 produces two copies of the project proposal in double-side print (P1 and P2 in FIG. 1).

The terms "direct print" refer to the printing of application data directly without an intervention of a printer driver or the like. Such direct print enables an intuitive and simple printing of desired data without requiring the user to make complicated print condition settings and the like.

Thus, in accordance with the present embodiment, the image forming apparatus 100 enables the user to print directly from the external storage device 14.

(Hardware Structure)

Figure 3:
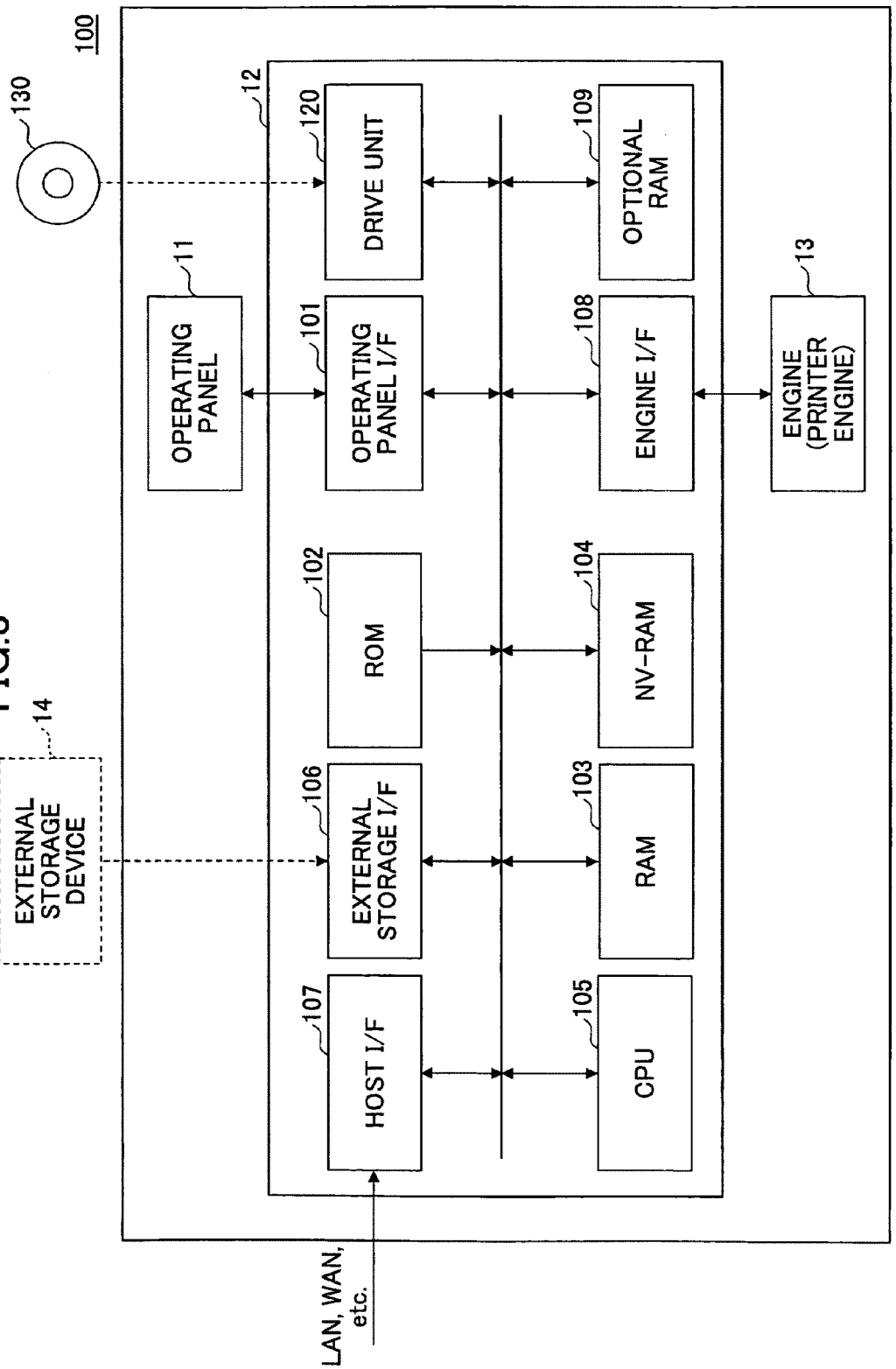
FIG. 3 shows a hardware structure of the image forming apparatus according to Embodiment 1.

With reference to FIG. 3, a description is given of a hardware structure of the image forming apparatus 100. The image forming apparatus 100, of which printing is a main function, includes the operating panel 11, a controller 12, and an engine 13, which are connected by a bus.

The operating panel 11 may include an input device and a display device. The input device of the operating panel 11 may include the various hardware keys shown in FIG. 2 for entering various operating signals into the image forming apparatus 100. The display device of the operating panel 11 may include an LCD panel display for displaying various information concerning an image forming operation, such as a print condition. The operating panel 11 is connected to the controller 12 via an operating panel I/F 101.

The controller 12 includes the operating panel I/F device 101; a read only memory (ROM) 102; a random access memory (RAM) 103; a non-volatile RAM (NV-RAM) 104; a central processing unit (CPU) 105; an external storage I/F device 106; a host I/F device 107; and an engine I/F device 108. The controller 12 also includes an interface for connecting an optional RAM 109 which may be optionally installed to expand the work memory area used for an image forming operation.

The ROM 102 stores a program (for providing an operating system (OS)) that is executed upon booting up of the image forming apparatus 100, various programs (application programs) for realizing the various functions of the image forming apparatus 100, and various other data.

The RAM 103 temporarily stores various programs or data read from the ROM 102. The NV-RAM 104 stores setting data concerning the image forming apparatus 100, such as initial setting values (concerning print control) for controlling an image forming operation. The CPU 105 may execute a program temporarily retained in the RAM 103.

Upon reception of print data via the host I/F device 107, the controller 12 executes a program (PDL parser) capable of interpreting a page description language (PDL) read from the ROM 102 onto the RAM 103, using the CPU 105. By interpreting the PDL, intermediate data (hereafter referred to as "image data") to be transferred to the engine 13 is generated.

Hereafter, a description is given of the various interface devices of the controller 12.

The operating panel I/F device 101 provides an interface for exchanging image signals and control signals with the operating panel 11. The external storage I/F device 106 may provide an interface for connecting the external storage device 14, such as a USB memory, to the image forming apparatus 100. The image forming apparatus 100 has a slot (not shown) for connecting the external storage I/F device 106. By inserting a connecting terminal of the external storage device 14 into the slot, data can be exchanged between the image forming apparatus 100 and the external storage device 14.

The host I/F device 107 provides an interface for connecting the image processing apparatus 100 with a data transmission path, such as a data communication network. The data communication network may include a wired or wireless local area network (LAN), a wide area network (WAN), or the Internet. The engine I/F device 108 provides an interface to exchange image signals and control signals with the engine 13.

The engine 13 may be configured to print the image data transferred via the engine I/F device 108 of the controller 12 on a sheet of recording paper (print sheet) by the electrophotography process. Alternatively, the printing process may involve an inkjet process.

Thus, in the image forming apparatus 100 of the present embodiment, the CPU 105 executes the program with which the PDL read into the RAM 103 of the controller 12 can be interpreted. Image data is generated from the application data acquired from the external storage device 14 via the external storage I/F device 106. The generated image data is transferred to the engine 13 via the engine I/F device 108 so that the data from the external storage device 14 can be printed.

(Controller System)

Figure 4:
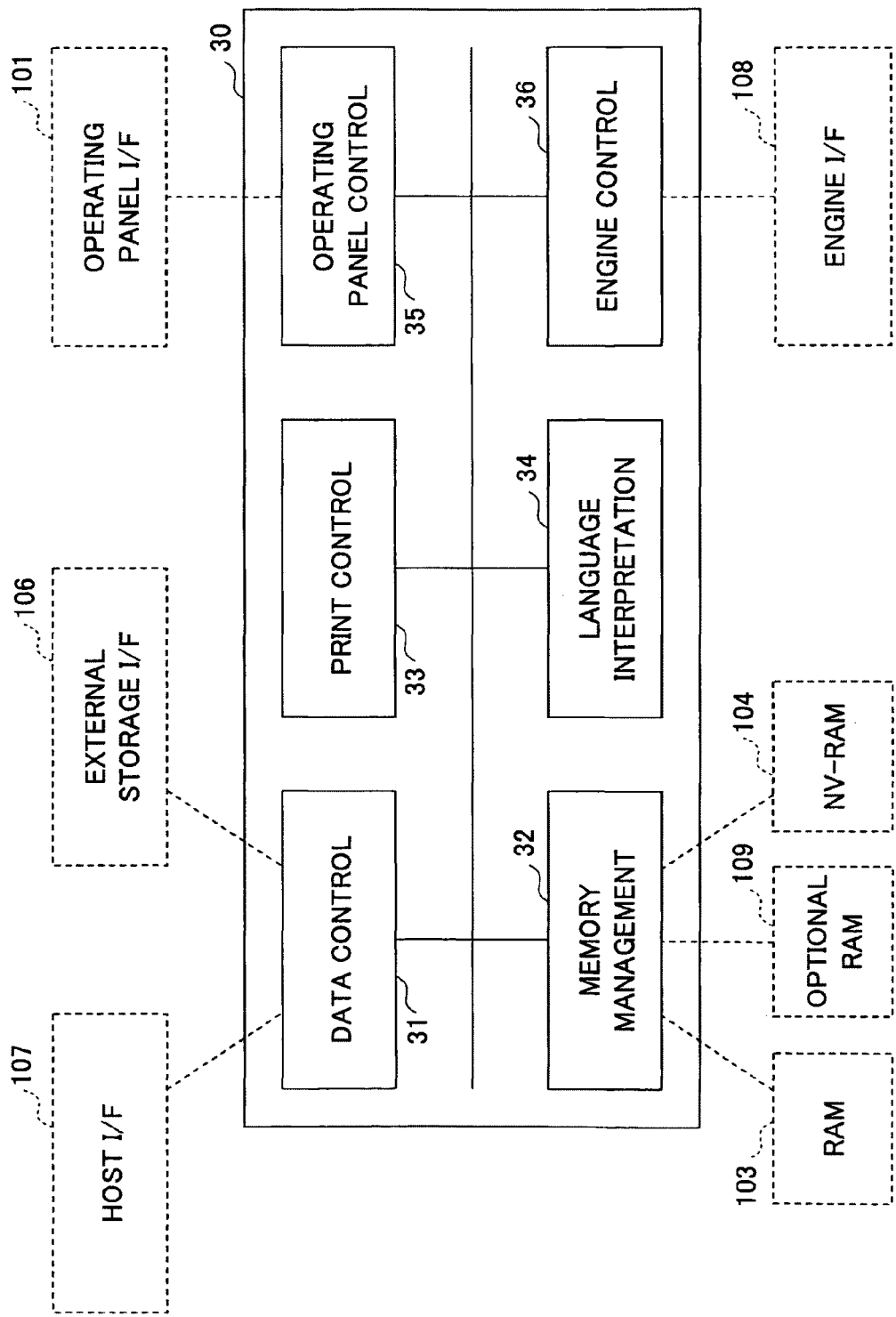
FIG. 4 shows a diagram of a controller system according to Embodiment 1.

Hereafter, a description is given of a structure of the controller system 30 for realizing the print function of the image forming apparatus 100, with reference to FIG. 4.

The individual functional units of the controller system 30 according to the present embodiment as described below are realized by the CPU 105 of the controller 12 of the image forming apparatus 100 executing a print control program.

(System Structure)

The controller system 30 includes a data control unit 31; a memory managing unit 32; a print control unit 33; a language interpretation unit 34; an operating panel control unit 35 configured to control the operating panel 11; and an engine control unit 36 configured to control the engine 13.

The data control unit 31 is configured to control the data communication I/F's such as the host I/F device 17 and the external storage I/F 106. The memory managing unit 32 is configured to control access to the memories such as the RAM 103, the NV-RAM 104, and the optional RAM 109, and to manage stored data (i.e., image data that the engine 13 can interpret). The print control unit 33 is configured to control an image forming operation based on a predicted memory usage at the time of printing. The language interpretation unit 34 is configured to interpret (parse) the PDL describing a print job and generate predetermined image data.

(Basic Operation of Print Function)

Hereafter, a description is given of how the print function is realized by the controller system 30 with the aforementioned functional units, with reference to an operation example involving a normal print operation in which a print job transmitted from a PC is printed.

(1) Reception of Print Job

The controller system 30 inputs the print job that the host I/F device 107 received from the PC to the controller 12 via the data control unit 31, and transfers the inputted print job to the memory managing unit 32. The print job is temporarily retained in a predetermined memory area of the RAM 103 of the controller 12.

(2) Analysis of Print Job

Using the language interpretation unit 34, the controller system 30 accesses the print job retained by the RAM 103 via the memory managing unit 32, and analyzes the print job. The language interpretation unit 34 generates data in a format that the engine 13 can interpret, i.e., bitmap image (predetermined image data), and transfers the generated image data to the memory managing unit 32. The memory managing unit 32 retains the image data in the RAM 103.

(3) Printing of Print Job

The controller system 30, using the engine control unit 36, accesses the image data retained in the RAM 103 via the memory managing unit 32, and transfers the accessed image data to the engine 13 via the engine I/F device 108.

In the above print operations (1) to (3), the controller system 30, based on a control signal from each of the functional units and via the operating panel control unit 35, transmits information about the print operation (such as an operation status information "Printing") to the operating panel 11 via the operating panel I/F device 101.

Thus, in accordance with the present embodiment, the system controller 30 ensures, via the memory managing unit 32, a memory area from the RAM 103 necessary for printing. The system controller 30 then temporarily retains, in the ensured memory area, various data handled in each processing step of the print operation, such as the print job data described in PDL or the image data generated after PDL interpretation.

In a case where a print job transmitted from an external device such as a PC is printed, how much memory area is required for printing the received print job cannot be known until the entire print job is inputted by the data control unit 31 into the controller system 30, and image data is generated by interpreting the print job by the language interpretation unit 34. As a result, depending on the data structure of the print job, its color structure, or its print conditions, a lack of memory, i.e., a memory overflow, may develop in the middle of a page being printed, resulting in an incomplete printing (i.e., the development of a print failure). This is disadvantageous to the user who made the print request. Such print failure due to a lack of memory particularly tends to occur in an inexpensive image forming apparatus that has a limited memory.

On the other hand, in the case where application data from the external storage device 14 is directly printed, as opposed to the case of printing from the PC, information about the application data (such as bibliographical information or attribute information (property information)) prior to the generation of a print job can be acquired. Thus, the controller system 30 can acquire such information about the application data from the application data entered by the data control unit 31 via the external storage I/F device 106. Based on the acquired various information, the control system 30 can predict how much memory area will be required for printing the relevant data.

Thus, in the controller system 30 according to the present embodiment, the print control unit 33 determines printability based on the predicted memory usage for a printing operation. Upon determining that the printing cannot be executed, the print control unit 33 controls the image forming operation based on a print method selected by the user.

(Print Control Function)

Figure 5:
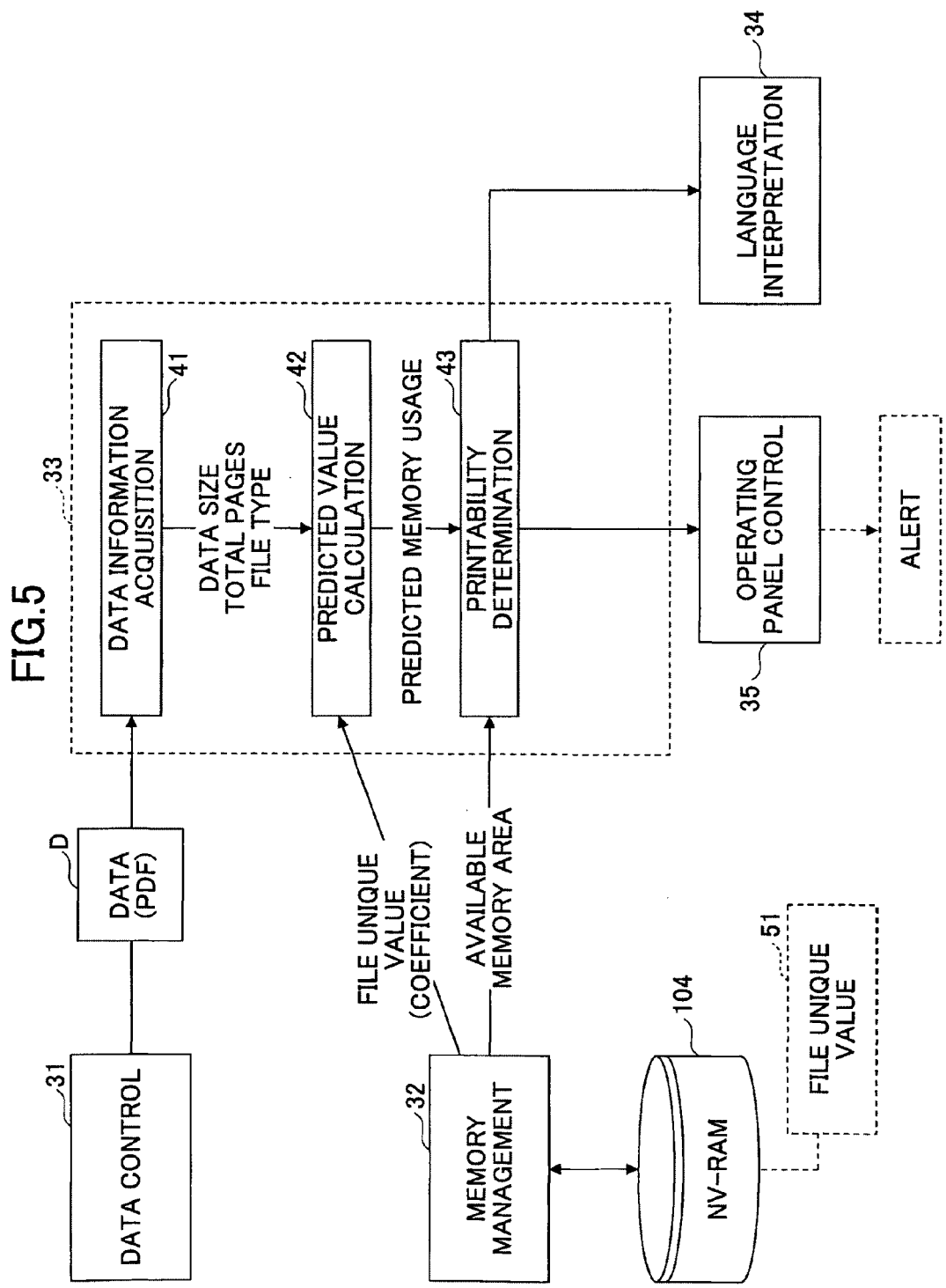
FIG. 5 shows a function diagram of the image forming apparatus according to Embodiment 1.
Figure 6:
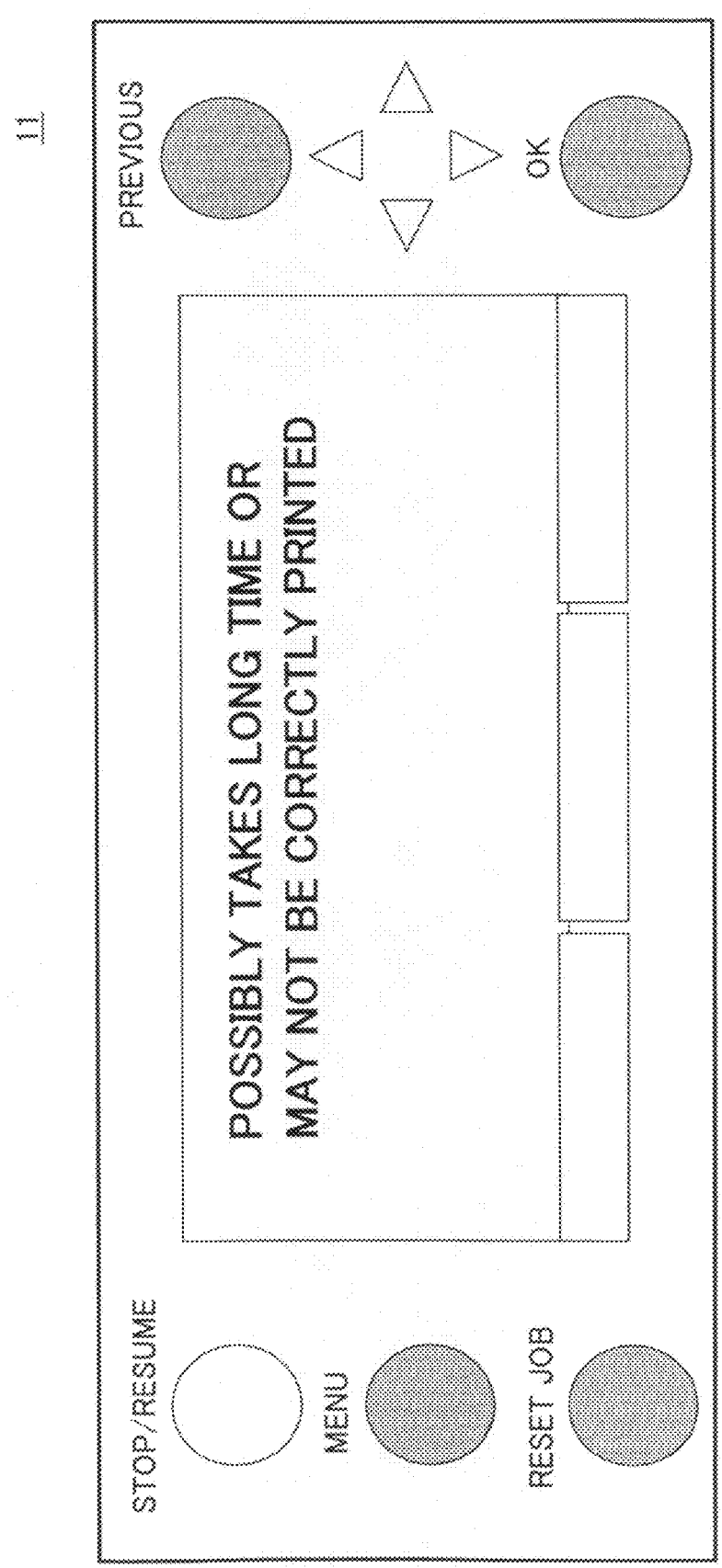
FIG. 6 shows an alert screen indicating a possible print overflow according to Embodiment 1.
Figure 7:
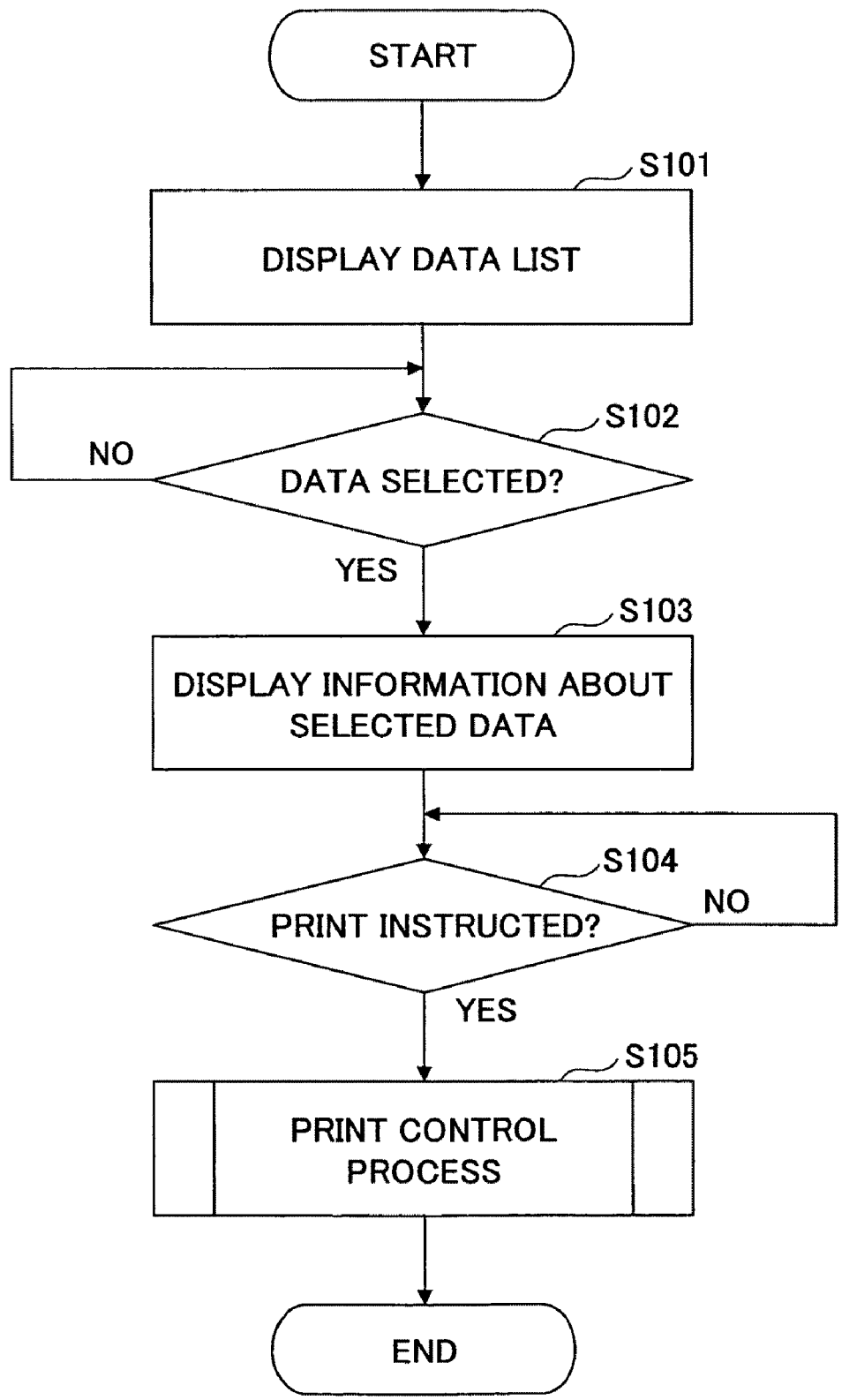
FIG. 7 shows a flowchart of a basic procedure for an image forming operation according to Embodiment 1.

With reference to FIGS. 5 through 7, a description is given of the print control function performed by the print control unit 33 of the controller system 30 when printing data from the external storage device 14 according to the present embodiment.

(Outline of Functional Structure)

FIG. 5 shows a functional structure of the image forming apparatus 100 according to Embodiment 1.

The image forming apparatus 100 includes a data information acquisition unit 41; a predicted value calculation unit 42; and a printability determination unit 43.

The data information acquisition unit 41 is configured to acquire information about data D from data D, which is print data acquired from the external storage device 14 in order to realize the aforementioned print control function. The predicted value calculation unit 42 calculates a predicted memory usage at the time of printing from a parameter value acquired by the parameter acquisition unit 41. The printability determination unit 43 determines whether, based on the predicted memory usage calculated by the predicted value calculation unit 42, data D can be printed with the memory capacity provided in the image forming apparatus 100.

The print control function realized by the aforementioned individual functions is described in detail below.

(Outline of Function Operation)

Hereafter, how the print control function of the image forming apparatus 100 is realized by the aforementioned individual functional units is described. In the following description, for ease of understanding, three basic operational steps for realizing the print control function are described.

(Step 1) Extraction of Relevant Data Information

First, the image forming apparatus 100 delivers file names of data D acquired from a predetermined memory area of the connected external storage device 14 to the operating panel 11 via the operating panel control unit 35. The operating panel 11 displays the received file names on the display screen 21, and lets the user select the file to be printed, via the UI function.

In response to a selection made via the UI function of the operating panel 11, the data information acquisition unit 41 acquires a data size, a total number of pages, and a file type (extension) of the selected data D. The data information acquisition unit 41 may acquire such information from bibliographical information about the data D or other information about the data D, such as file attribute information. For example, from the extension of the data D "Project proposal.pdf", it can be known that the file type is PDF. In the case of a PDF file, from the document attribute information (property information), information about a stored location (file path), a data size (number of bytes), a total number of pages, etc., can be acquired.

While in the above method the information about the data D is acquired form the bibliographical information about the data D or the attribute information about the file, this is merely an example. In another embodiment, in a file system environment with management data for centrally managing such information, reference may be made to the management data associated with particular data. In other words, any method may be used as long as information about the data size, total number of pages, and file type of the data D can be acquired.

The thus acquired information about the data D is delivered from the data information acquisition unit 41 to the predicted value calculation unit 42.

(Step 2) Calculation of Predicted Memory Usage

The predicted value calculation unit 42 calculates a predicted memory usage for printing the data D by substituting parameter values into a predetermined calculating formula. The parameter values may include the data size and total number of pages of the data D acquired by the data information acquisition unit 41, and a file unique value 51. The file unique value 51 is a coefficient for memory usage calculation that is stored in association with each file type in a nonvolatile memory device such as the NV-RAM 104 in advance.

The file unique value 51, which is a coefficient, may be obtained by measuring a memory usage when sample data for each file type (such as file groups "*.pdf", "*.jpg", "*tiff", or the like, which are expected to be printed from the external storage device 14 with high frequency) is printed in advance, and then analyzing the measured values to extract a characteristic memory usage per page of each file type.

The size of the image data that is temporarily stored in the RAM 103 by the language interpretation unit 34 varies depending on the file type because the data is converted into a data format that the engine 13 can interpret. Thus, in order to predict the memory usage at the time of printing, it is necessary to incorporate a property that characterize the change in data size when the image data is generated from the original data (print job) by conversion. Hence, the file unique value 51 is determined for each file type and stored in a predetermined memory area, such as the NV-RAM 104 (coefficient retaining unit) of the controller 12 of the image forming apparatus 100, in association with the file type.

Based on the file type of the data D acquired by the data information acquisition unit 41, the predicted value calculation unit 42 acquires the corresponding file unique value 51 stored in the predetermined memory area such as the NV-RAM104. Thus, the file unique value 51 can be uniquely identified by the file type. The data D selected by the user may not necessarily correspond to any of the assumed file types (for which file unique values 51 are prepared in advance). In such a case, the predicted value calculation unit 42 acquires a default coefficient value for memory usage calculation.

The predicted value calculation unit 42 then calculates a predicted memory usage at the time of printing the data D by using the aforementioned parameter values for predicted value calculation. Specifically, the predicted value calculation unit 42 calculates a predicted memory usage A (predicted value) per page in accordance with a following calculating formula:

$$A=(D/P) \times K \quad \text{(Equation 1)}$$

where D is data size (in bytes), P is the total number of pages, and K is the file unique value (coefficient value).

The predicted value calculation unit 42 delivers the calculated predicted memory usage A to the printability determination unit 43.

(Step 3) Determination of Printability

The printability determination unit 43 compares the predicted memory usage A calculated by the predicted value calculation unit 42 and a memory capacity (free space memory capacity) that is currently available as a work memory according to the memory managing unit 32, and determines whether the data D can be printed based on a comparison result. Based on the determination result, the printability determination unit 43 requests the operating panel control unit 35 or the language interpretation unit 34 to perform a predetermined process.

When the predicted memory usage A is equal to or smaller than the available memory capacity, the printability determination unit 43 determines that the data D can be printed. When the predicted memory usage A is greater than the available memory capacity, it is determined that the data D cannot be printed (because of a potential print failure due to lack of memory).

When the printing is possible, the printability determination unit 43 instructs the language interpretation unit 34 to start a language interpretation process, thereby initiating a normal print operation. When the printing cannot be performed, the printability determination unit 43 instructs the operating panel control unit 35 (alert display unit) to display a message on the display screen 21 alerting the user about a possible print error, as shown in FIG. 6.

Thus, the operating panel 11 displays the alert screen as shown in FIG. 6 in response to an image signal and a control signal from the operating panel control unit 35, thereby notifying the user. The operating panel 11 then receives an instruction to start or reset the print job from the user via the UI function (such as the print stop/resume key 23 or the job reset key 25).

By performing the above print control process, the printability determination unit 43 can prevent a disadvantageous effect (such as an incomplete print) to the user due to lack of memory when printing data from the external storage device 14.

(Continuation of Printing)

The print control unit 33 has a control function (print control unit) whereby, prior to displaying the above alert screen on the operating panel 11, several solutions for enabling printing are presented to the user, and an image forming operation in accordance with a print method determined by the user's selection is instructed. The alternative print methods presented by the print control unit 33 may include the following:

(1) Method of Using the External Storage Device 14 as a Work Memory for Printing ("Work Memory Expanding Method")

When it is determined by the printability determination unit 43 that printing cannot be performed, the print control unit 33 prompts the user to select whether the external storage device 14 connected to the image forming apparatus 100 should be used as a memory area (work memory area) for temporarily storing the image data generated by the language interpretation unit 34, via the operating panel 11. Upon reception of a positive instruction from the user, the print control unit 33 instructs the data control unit 31 to temporarily retain the image data generated by the language interpretation unit 34 in a predetermined memory area of the external storage device 14. The remaining print operation is then continued by the engine control unit 36.

(2) Method of Printing Based on Lossy Compression ("Lossy-Compression Image Method")

When it is determined by the printability determination unit 43 that printing cannot be performed, the print control unit 33 prompts the user to select whether printing should be continued with lossy compression although this would result in a image quality deterioration, via the operating panel 11. In response to an instruction from the user to employ lossy compression, the print control unit 33 instructs the memory managing unit 32 to perform lossy compression on the image data generated by the language interpretation unit 34 and temporarily retain the compressed data in a predetermined memory area of the RAM 103. In the subsequent print operation, the lossy-compressed image data is transferred by the engine control unit 36 to the engine 13 where the data is expanded by and then printed.

(3) Method of Printing with Lower Resolution ("Lower-Resolution Image Method")

When it is determined by the printability determination unit 43 that printing cannot be performed, the control unit 33 prompts the user to select whether printing should be continued with lowered resolution although this would result in a print quality lower than a designated resolution, via the operating panel 11. In this case, the print control unit 33 presents to the user plural selection candidates in order of possible printable resolutions under the currently available memory capacity.

For example, when the designated resolution for data D is 1200 (dpi), selection candidates are presented in order of 600, 300, and 200 (dpi) based on the currently available memory capacity.

In response to an instruction from the user to print with a lower resolution, the print control unit 33 instructs the language interpretation unit 34 to generate image data with a resolution lower than the designated resolution. The print control unit 33 also instructs the memory managing unit 32 to temporarily retain the image data generated with lower resolution in a predetermined memory area of the RAM 103. The subsequent print operation is continued by the engine control unit 36.

Thus, the print control unit 33 presents several print-enabling solutions to the user. In this way, although print quality may degrade in some cases, the image forming operation can be controlled so that a print item desired by the user can be preferentially and reliably printed.

(Selection of a Calculating Formula for Calculating the Predicted Value Based on a Print Condition)

In addition to the above-described basic operations of the print control function according to the present embodiment, the following technical features may be combined.

In the foregoing, an example has been described in which the predicted memory usage A is calculated by the predicted value calculation unit 42 in the print control unit 33 in accordance with Equation 1 in Step 2 ("Calculation of predicted memory usage"). However, depending on the print conditions set for data D, the language interpretation unit 34 may not necessarily generate image data on a page by page basis. For example, there may be cases where the image data temporarily retained in the RAM 103 via the memory managing unit 32 may correspond to several pages.

The print conditions may include a "sort/stack" print when designating a number of copies, a "color/monochrome" designating print, a "size/layout change", a "double-side" print, and any other conditions that the print function of the image forming apparatus 100 allows. For example, when the sort print is designated as a print condition, a designated number of sets of copies of data D are printed on a "print-all-pages" basis, so that a memory capacity is required that can temporarily retain the image data for all of the pages. In the case of double-side printing, a memory capacity is required that can temporarily retain the image data for two pages corresponding to the upper and lower sides. These cases cannot be properly handled by the aforementioned Equation 1.

Thus, the predicted value calculation unit 42 may include plural calculating formulas for calculating plural kinds of the predicted memory usage A based on the result of analysis of the print condition. Depending on the acquired print condition, the predicted value calculation unit 42 switches the calculating formula. For example, when the print condition indicates a sort print, the predicted memory usage A is calculated by using the following calculating formula:

$$A = D \times K \qquad \text{(Equation 2)}$$

where D is data size (in bytes), and K is the file unique value (coefficient value).

When the print condition indicates the sort print, the predicted value calculation unit 42 requires a memory capacity for temporarily retaining the image data for all of the pages. Thus, instead of Equation 1 whereby the predicted memory usage A per page is calculated, Equation 2 is used whereby the predicted memory usage A for all of the pages is calculated.

Further, in the case of the double-side print as the print condition, the predicted memory usage A is calculated using the following calculating formula:

$$A = ((D/P) \times K) \times 2 \qquad \text{(Equation 3)}$$

where D is data size (in bytes), P is the total number of pages, and K is the file unique value (coefficient value).

In the case of the double-side print, the predicted value calculation unit 42 requires a memory capacity for temporarily retaining the image data for the two pages corresponding to the upper and lower sides. Thus, instead of Equation 1 whereby the predicted memory usage A is calculated on a per-page basis, Equation 3 is used whereby the predicted memory usage A is calculated on a per-two-pages basis.

When switching the calculating formula depending on the print condition as described above, the predicted value calculation unit 42, based on the print condition that is read out on the RAM 103 at the time of printing, identifies the calculating formula that is associated with the particular print condition in advance based on the analysis results.

The print condition may be a default value retained in the NV-RAM 104 in advance for each print condition. The default value may be read out on the RAM 103 upon booting up of the image forming apparatus 100. The print condition value that is read may be changed when a print condition setting is entered via the UI function of the operating panel 11.

Thus, the predicted value calculation unit 42 can calculate the predicted memory usage A by switching the calculating formula depending on the print condition, whereby not only the information about data D but also the print condition, which greatly affects the use of memory during a print operation, can be incorporated. Thus, printability can be determined based on a more accurate predicted value.

(Procedure)

In the following, a description is given of the above image forming operation performed by the image forming apparatus according to the present embodiment with reference to FIG. 7. Thereafter, a description is given of a specific procedure performed by the print control function during the image forming operation, with reference to FIG. 8. Each of the following procedures involves steps that are mainly performed by an image forming program and a print control program executed by the CPU 105 of the controller 12.

(Basic Procedure for Image Formation)

FIG. 7 shows a flowchart of a basic procedure for performing the image forming operation according to Embodiment 1.

In step S101, the controller 12 of the image forming apparatus 100, based on the information about data D stored in the external storage device 14 that is acquired via the external storage I/F device 106, causes the file names of the stored data D (i.e., a list of print data files) to be displayed on the display screen 21 of the operating panel 11, via the operating panel I/F device 101.

The image forming apparatus 100 waits until a selection is made regarding the data D to be printed via the UI function of the operating panel 11 ("No" in step S102). Upon reception of a selection concerning the data D to be printed via the UI function of the operating panel 11 ("Yes" in step S102), the image forming apparatus 100 causes, via the operating panel I/F device 101 of the controller 12, the information about data D that has been previously acquired (such as a print condition) to be displayed on the display screen 21 of the operating panel 11 (step S103).

The image forming apparatus 100 waits until the user, after confirming the various information displayed, enters an instruction to start printing via the UI function of the operating panel 11 (step S104).

Upon reception of an instruction to start printing from the user via the UI function of the operating panel 11 ("Yes" in step S104), the image forming apparatus 100 performs the predetermined print control process using the controller 12 (step S105). As a result, the image data generated by controller 12 is delivered via the engine I/F device 108 to the engine 13 whereby printing is performed.

Thus, the predetermined data stored in the external storage device 14 can be printed.

(Print Control Procedures)

In the following, a description is given of various print control procedures performed in the above image forming operation. The following procedures are performed by the print control unit 33 of the controller system 30, which has been described above with reference to "Software configuration". The control methods mentioned with reference to "Outline of function operation" are also described individually.

Example 1

Print Control Procedure for Issuing a Possible Print Failure Alert

Figure 8:
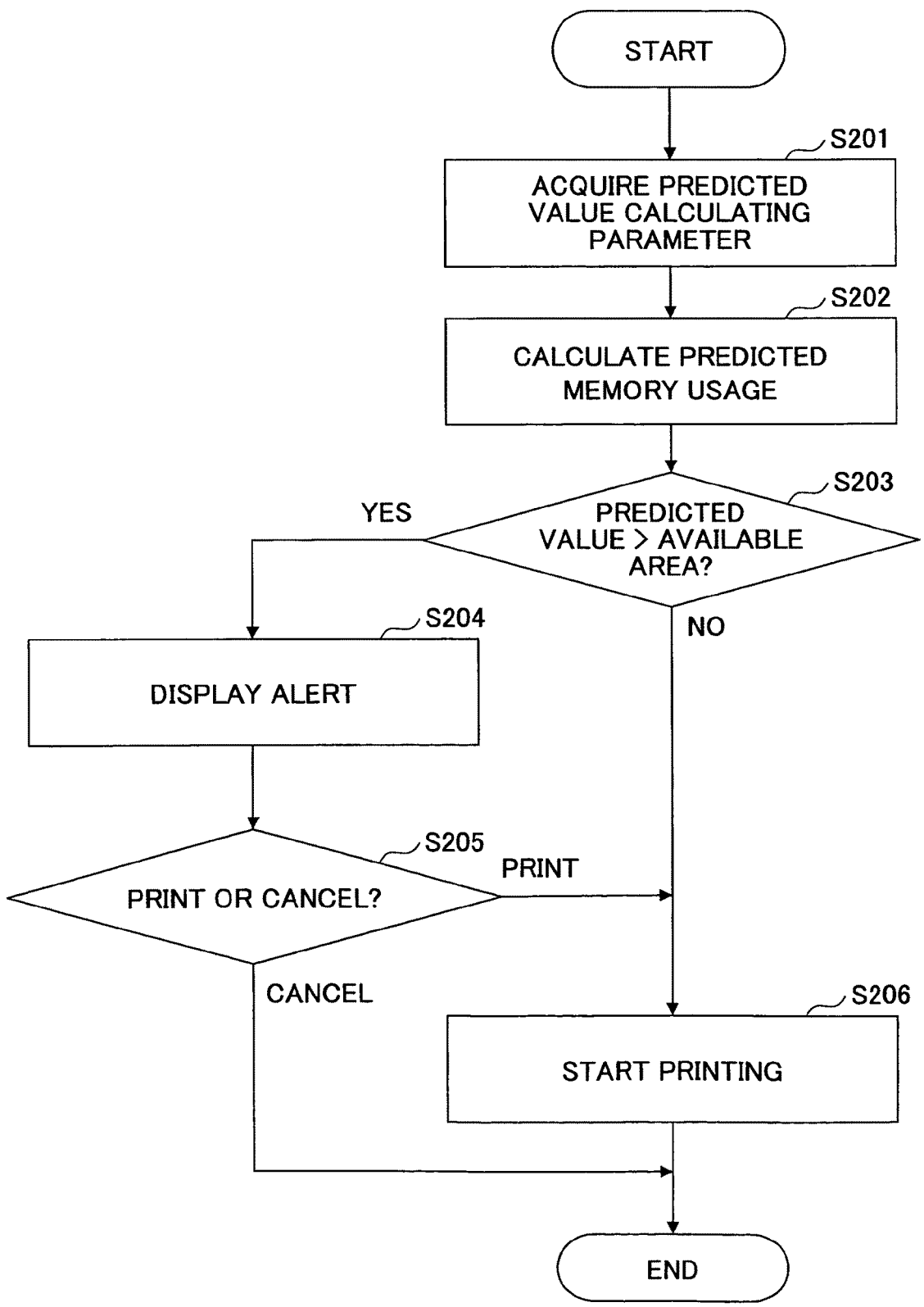
FIG. 8 shows a flowchart of an example (Example 1) of the print control procedure according to Embodiment 1.

FIG. 8 shows a flowchart of an example of the print control procedure according to Embodiment 1.

The print control unit 33 first acquires information about data size, total number of pages, and file type from the bibliographical information about the data D to be printed or the file attribute information, using the parameter acquisition unit 41. Based on the acquired information about the file type (extension) acquired by the parameter acquisition unit 41, the print control unit 33 acquires the file unique value 51, which is the coefficient for calculating the predicted value that is stored in a nonvolatile memory device, such as the NV-RAM104, in advance for each file type (step S201).

The print control unit 33 substitutes the file unique value 51 and the values of the previously acquired information including the data size and the total number of pages into the relevant parameters of the calculating formula (Equation 1). The predicted value calculation unit 42 then calculates the predicted memory usage A expected at the time of printing the data D (step S202).

The print control unit 33, using the printability determination unit 43, then compares the predicted memory usage A calculated by the predicted value calculation unit 42 and the currently available memory capacity (free space memory capacity) (step S203).

If the printability determination unit 43 determines that the predicted memory usage A is equal to or smaller than the available memory capacity ("No" in step S203), the print control unit 33 causes the language interpretation unit 34 to generate image data that the engine 13 can interpret, and start printing (step S206).

If the printability determination unit 43 determines that the predicted memory usage A is greater than the available memory capacity ("Yes" in step S203), the print control unit 33 causes, via the operating panel control unit 35, an alert screen to be displayed on the display screen 21 of the operating panel 11, notifying the user of a possible print failure due to lack of memory (step S204).

Upon reception of an instruction to start printing from the operating panel control unit 35 ("Print" in step S205) after the alert screen is displayed, the print control unit 33 transitions to step S206 to start printing. Upon reception of a job cancellation instruction ("Cancel" in step S205), the procedure ends without performing step S206.

Thus, in the image forming apparatus 100 according to the present embodiment, by performing the above procedure, the disadvantageous effect (such as incomplete print) to the user due to lack of memory can be prevented when printing the data from the external storage device 14.

Example 2

Figure 9:
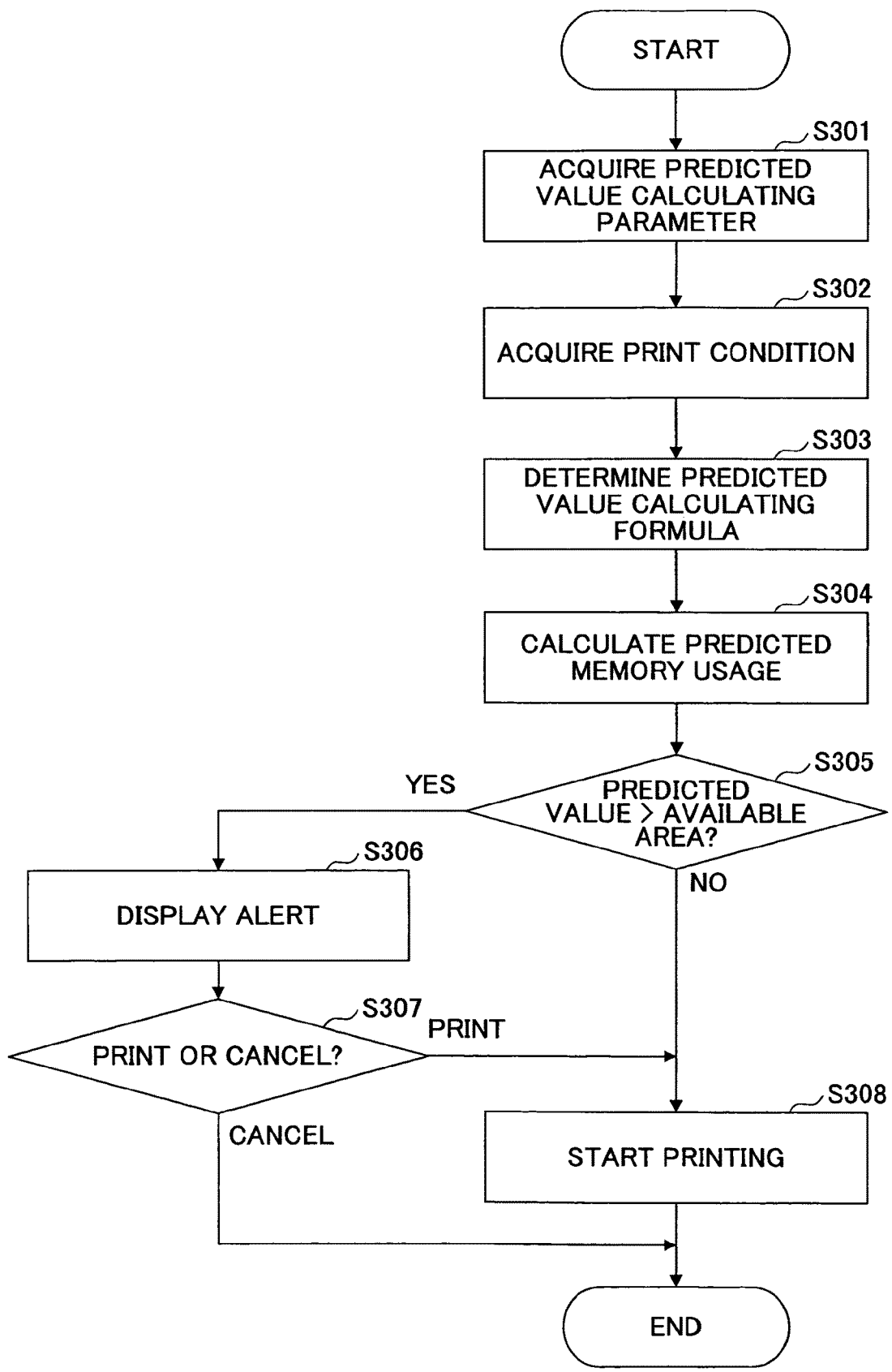
FIG. 9 shows another example (Example 2) of the print control procedure according to Embodiment 1.

Print Control Procedure for Switching the Predicted Value Calculating Formula Depending on Print Condition FIG. 9 shows a flowchart of another example of the print control procedure according to Embodiment 1.

The print control unit 33 acquires, using the parameter acquisition unit 41, the information about the data size, total number of pages, and file type as the predicted value calculation parameters from the information about the data D. In Example 2, in addition to such information, information about a print condition for printing data D is acquired, and the predicted value calculating formula is switched depending on the acquired print condition. Because step S305 and the subsequent steps shown in FIG. 9 are the same as step S203 and the subsequent steps that have been described above with reference to FIG. 8, the following only describes steps S301 to S304.

First, the print control unit 33 acquires, using the parameter acquisition unit 41, information about data size, total number of pages, and file type from the bibliographical information about the data D to be printed, the file attribute information, and so on. Based on the file type information (extension) acquired by the parameter acquisition unit 41, the print control unit 33 acquires the file unique value 51, which is the coefficient for calculating the predicted value that is stored in a nonvolatile memory device, such as the NV-RAM104, in advance for each file type (step S301).

The print control unit 33 then acquires the information about the print condition under which data D should be printed (step S302).

The print control unit 33, using the predicted value calculation unit 42, then determines the calculating formula for calculating the predicted value depending on the acquired print condition. For example, the print control unit 33 refers to the latest print condition in the RAM 103. When the sort print condition is set in the case of printing plural copies, the calculating formula may be switched from Equation 1 for calculating the default predicted value, to Equation 2 in order to calculate the predicted memory usage A so that it can be determined whether the image data for all of the pages can be temporarily retained (step S303).

The print control unit 33, using the predicted value calculation unit 42, then substitutes the previously obtained values of the various information for predicted value calculation into the relevant parameters of the predicted value calculating formula determined by the process of step S303, thereby calculating the predicted memory usage A expected at the time of printing data D (step S304).

Thus, by performing the above procedure, the image forming apparatus 100 can calculate the predicted memory usage A by incorporating the effect of the print condition, which greatly affects the use of memory during the print operation. Accordingly, printability can be determined based on a more accurate predicted value.

In the following, a description is given of print control procedures for presenting several print methods as solutions for avoiding the print failure in the event that a possible print failure is determined, and for performing the subsequent processes in response to an instruction from the user.

Example 3

Print Control Procedure for Presenting a Work Memory Expanding Method

Figure 10:
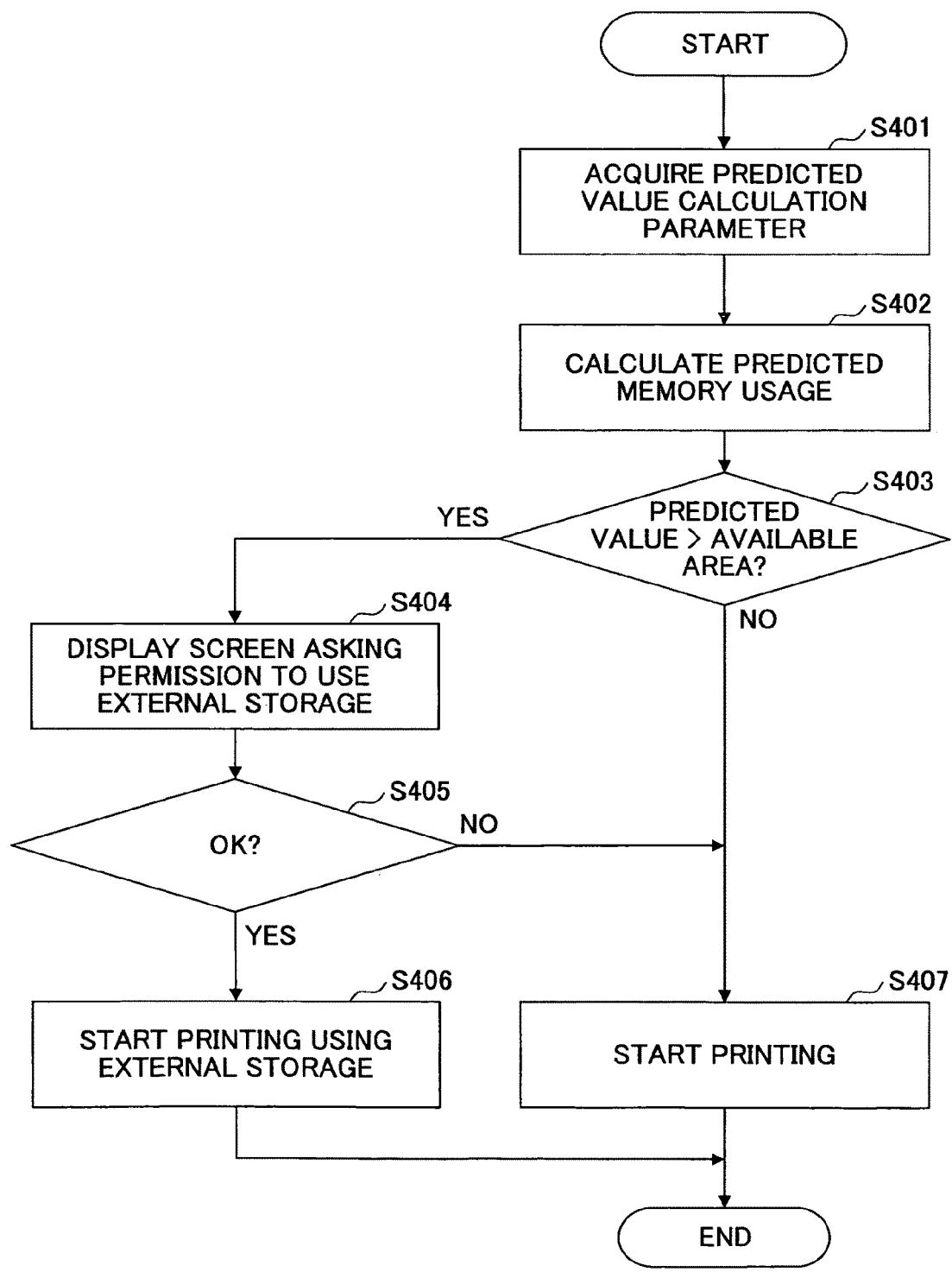
FIG. 10 shows a flowchart of another example (Example 3) of the print control procedure according to Embodiment 1.

FIG. 10 shows a flowchart of another example (Example 3) of the print control procedure according to Embodiment 1.

In accordance with the present embodiment, the print control unit 33, using the parameter acquisition unit 41, initially acquires information about data size, total number of pages, and file type from the bibliographical information about the data D to be printed or the file attribute information. Further, based on the information about the file type (extension), the printer control unit 33, using the parameter acquisition unit 41, acquires the file unique value 51. The file unique value 51 is the coefficient for calculating the predicted value for each file type that is stored in a nonvolatile memory device, such as the NV-RAM104, in advance (step S401).

The print control unit 33, using the predicted value calculation unit 42, substitutes the acquired file unique value 51 and the values of the various previously acquired information about the data size and total number of pages into the relevant parameters of the predicted value calculating formula (Equation 1), thereby calculating the predicted memory usage A expected at the time of printing the data D (step S402).

The print control unit 33, using the printability determination unit 43, then compares the calculated predicted memory usage A and the currently available memory capacity (free space memory capacity) to determine whether the predicted memory usage A is greater than the available memory capacity (step S403).

If the predicted memory usage A is determined to be equal to or smaller than the available memory capacity ("No" in step S403), the print control unit 33 causes the language interpretation unit 34 to generate image data that the engine 13 can interpret, and starts printing the data (step S407).

If the predicted memory usage A is determined to be greater than the available memory capacity ("Yes" in step S403), the print control unit 33 causes, via the operating panel control unit 35, a permission requesting screen to be displayed on the display screen 21 of the operating panel 11. The permission requesting screen asks the user to indicate whether the connected external storage device 14 may be used as a work memory for temporarily retaining the image data (step S404).

After the permission requesting screen is displayed, upon reception of an instruction from the operating panel control unit 35 not granting permission ("No" in step S405), the print control unit 33 transitions to step S407 to start printing without using the external storage device 14 as a work memory (step S407).

Upon reception of a permitting instruction ("Yes" in step S405), the external storage device 14 is used as a work memory, the image data generated by the language interpretation unit 34 is temporarily retained in the expanded work memory, and the printing of the retained image data is started (step S406).

Example 4

Print Control to Present a Lossy Compression Image Method

Figure 11:
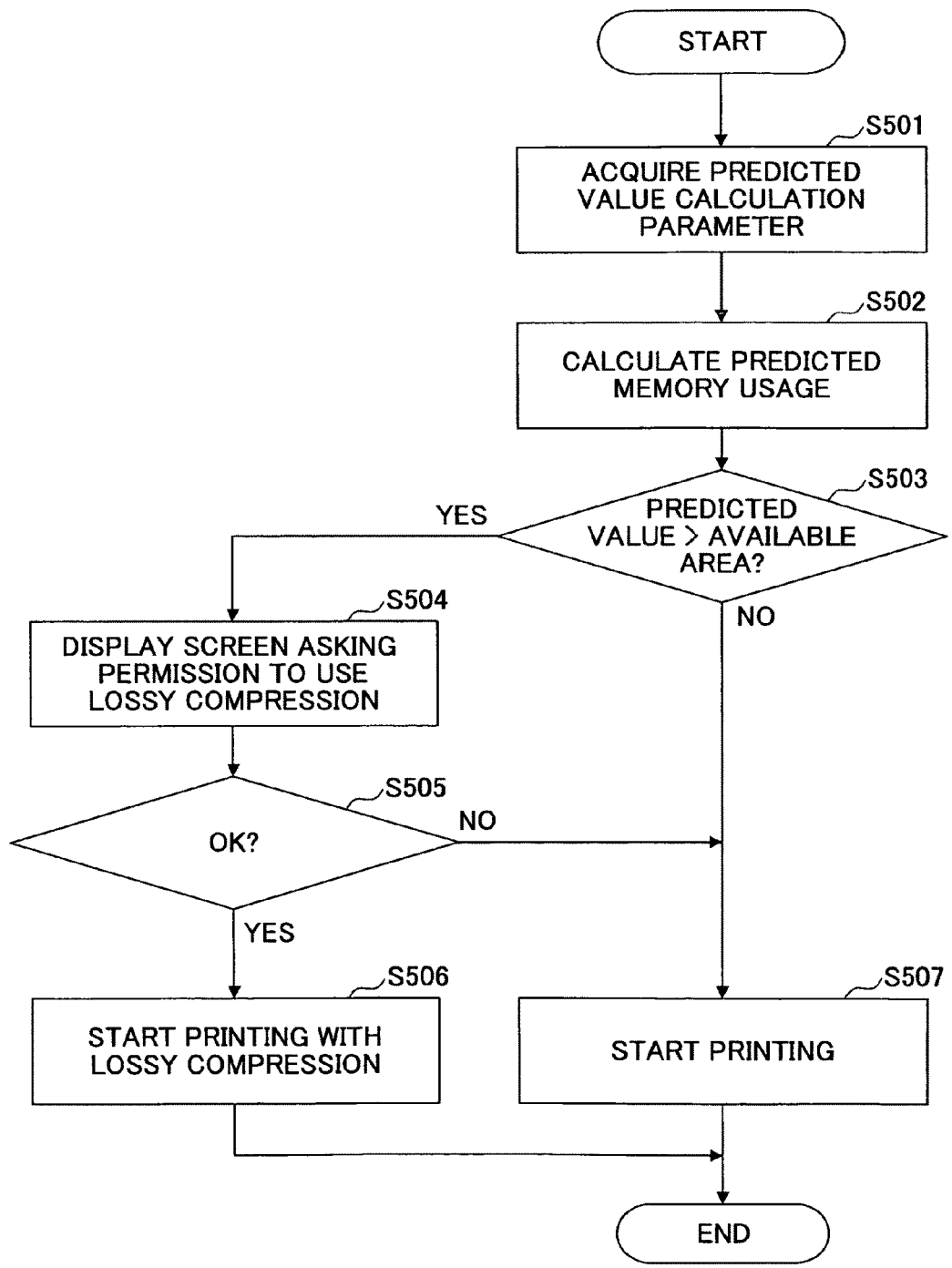
FIG. 11 shows a flowchart of another example (Example 4) of the print control procedure according to Embodiment 1.

FIG. 11 shows a flowchart of another example (Example 4) of the print control procedure according to Embodiment 1.

The procedure up to and including step S503 shown in FIG. 11 is the same as the procedure up to step S403 described with reference to FIG. 10. Thus, the following describes the procedure from steps S504 to S507.

If it is determined by the printability determination unit 43 that the predicted memory usage A is equal to or smaller than the available memory capacity ("No" in step S403), the print control unit 33 causes the language interpretation unit 34 to generate image data that the engine 13 can interpret, and starts printing (step S407).

If it is determined by the printability determination unit 43 that the predicted memory usage A is greater than the available memory capacity ("Yes" in step S503), the print control unit 33 causes, via the operating panel control unit 35, a print permission screen to be displayed on the display screen 21 of the operating panel 11, asking the user for a permission as to whether printing may be performed by temporarily retaining the image data that has been lossy-compressed upon generation in a work memory, and using the image data (step S504).

After the print permission screen is displayed, upon reception of a non-print-permitting instruction via the operating panel control unit 35 ("No" in step S505), the print control unit 33 transitions to step S507 and starts printing the image data that has not been lossy-compressed by the language interpretation unit 34 (step S507). On the other hand, upon reception of a print permission ("Yes" in step S505), the image data that has been lossy-compressed by the language interpretation unit 34 is temporarily retained in the work memory, and the retained image data is then expanded by the engine 13, thereby starting to print (step S506).

(Print Control Presenting a Lower Resolution Image Method)

Figure 12:
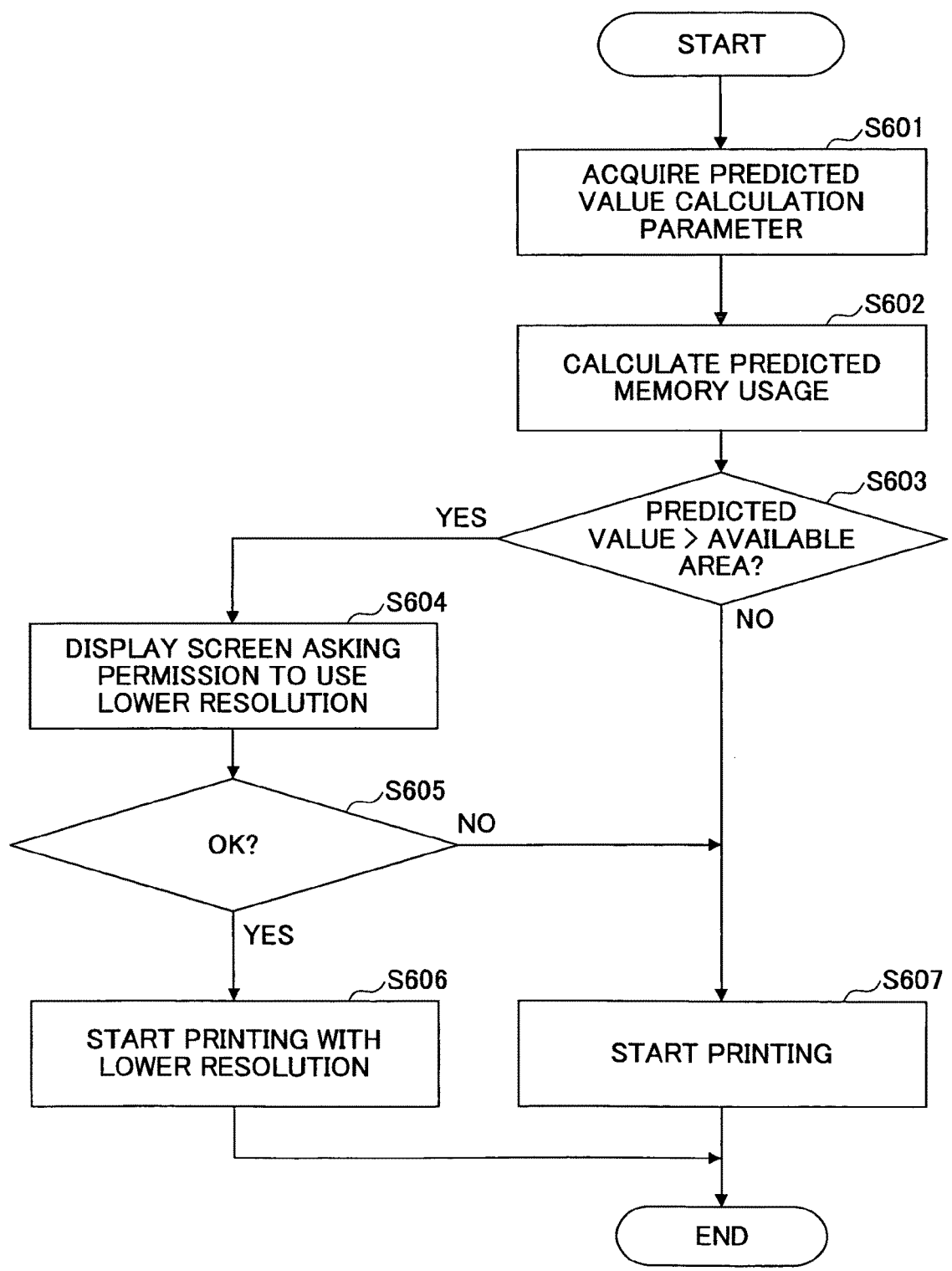
FIG. 12 shows another example (Example 5) of the print control procedure according to Embodiment 1.

FIG. 12 shows a flowchart of another example (Example 5) of the print control procedure according to Embodiment 1.

The procedure up to and including step S603 shown in FIG. 12 are the same as the procedure up to and including step S403 described with reference to FIG. 10. Thus, in the following, the procedure between steps S604 to S607 are described.

If it is determined by the printability determination unit 43 that the predicted memory usage A is equal to or smaller than the available memory capacity ("No" in step S603), the print control unit 33 causes the language interpretation unit 34 to generate image data that can be interpreted by the engine 13, and starts to print (step S607).

If it is determined by the printability determination unit 43 that the predicted memory usage A is greater than the available memory capacity ("Yes" in step S603), the print control unit 33 causes, via the operating panel control unit 35, a print permission screen to be displayed on the operating panel 11 display screen 21, asking the user for a print permission as to whether printing may be performed by temporarily retaining the image data whose resolution has been lowered upon generation in a work memory and using the thus retained image data (step S604).

After the print permission screen is displayed, upon reception of an instruction not permitting the printing via the operating panel control unit 35 ("No" in step S605), the print control unit 33 transitions to step S607 and causes the language interpretation unit 34 to generate image data without adjusting its resolution, and starts to print (step S607).

Upon reception of a print permission ("Yes" in step S605), the print control unit 33 causes the language interpretation unit 34 to temporarily retain the image data with lowered resolution in a work memory and starts printing the thus retained image data (step S606).

Thus, in accordance with the present embodiment, the image forming apparatus 100 can control the print process so that, although the print quality may be degraded in some cases, certain print items desired by the user can be preferentially and reliably printed.

Summary

Thus, in the image forming apparatus 100 according to Embodiment 1 of the present invention, when data D stored in the external storage device 14 is printed, a memory usage A that is expected at the time of printing the data is predicted based on various information about the data, such as bibliographical information, attribute information, and print conditions. When the predicted value A exceeds the currently available memory capacity (free space memory capacity), an alert is issued to the user and a print environment is provided where the user is allowed to select whether or not to proceed with the subsequent print operation.

Thus, in the image forming apparatus 100, a potential print failure due to lack of memory (memory overflow) at the time of printing can be detected prior to the start of an image forming operation (i.e., before the generation of image data that can be interpreted by the engine 13), thereby preventing a disadvantageous effect (incomplete print) to the user.

Embodiment 2

In accordance with the print control function in the foregoing Embodiment 1, the printability determination unit 43 determines whether printing is possible with an available memory capacity and, upon determination of non-printability (i.e., a possible print failure), predetermined print methods are presented to the user.

Figure 13:
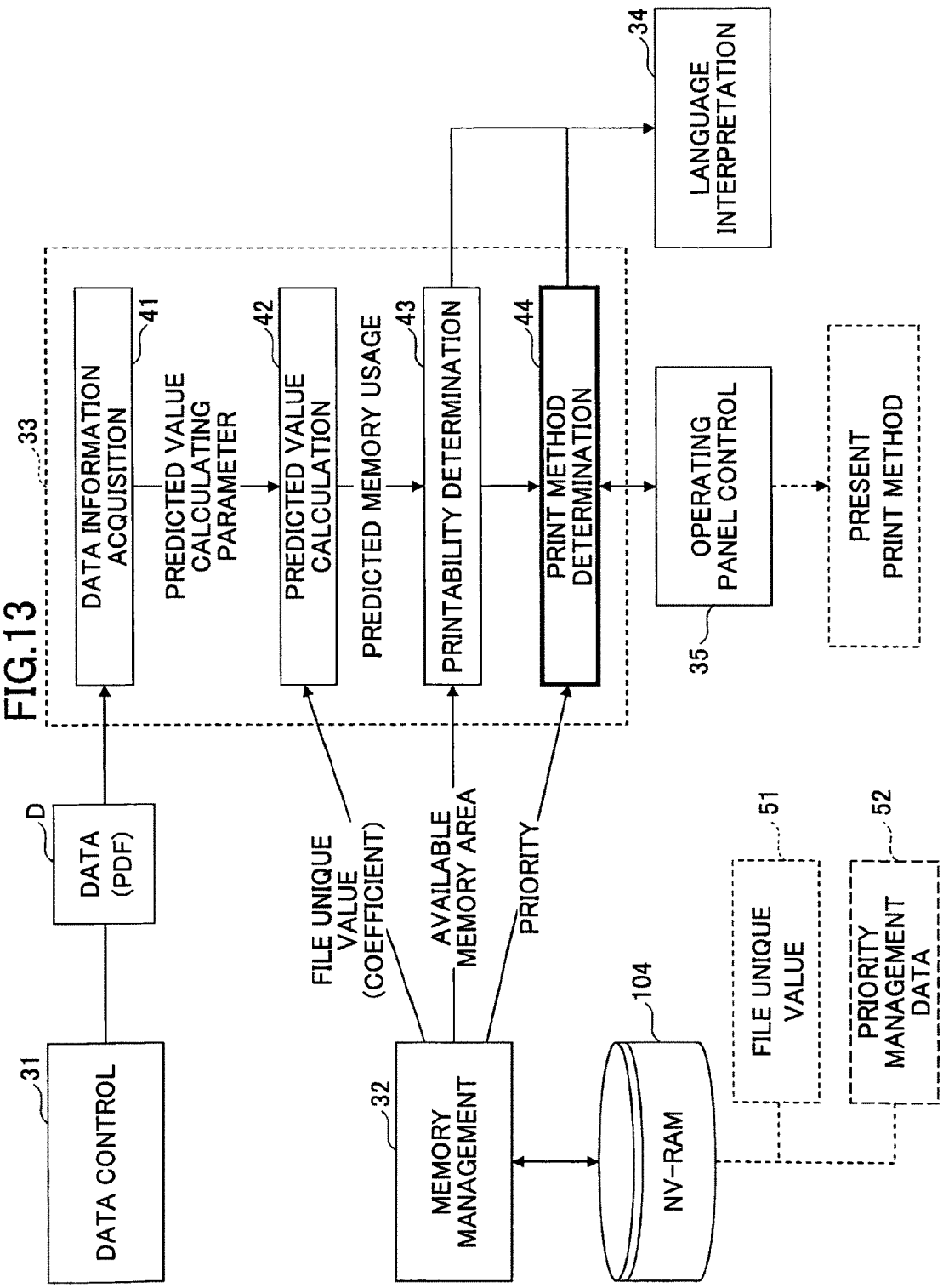
FIG. 13 shows a function diagram of an image forming apparatus according to Embodiment 2.
Figure 15:
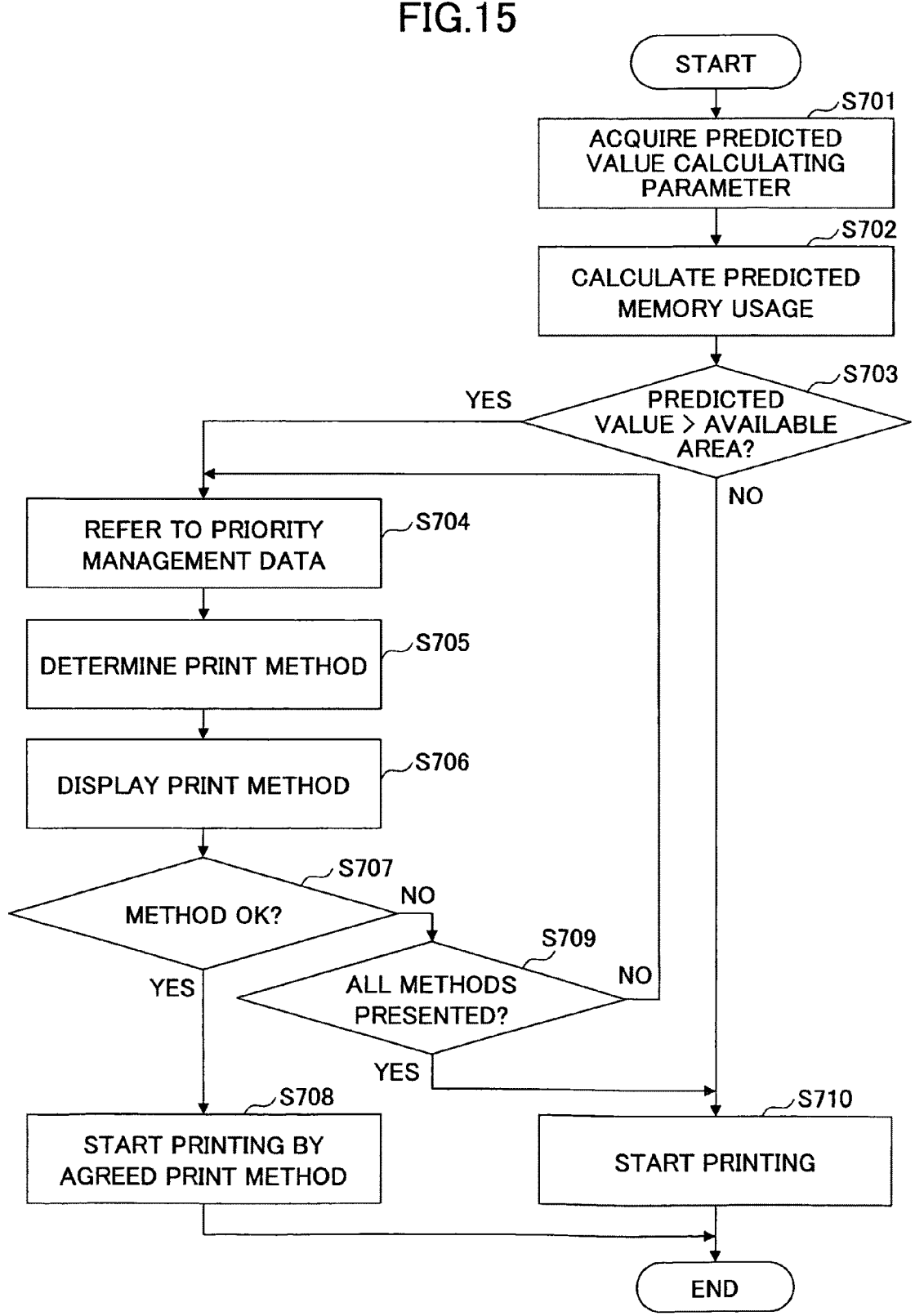
FIG. 15 shows a print control procedure according to Embodiment 2.

In accordance with the print control function of Embodiment 2, print methods are presented to the user in accordance with a predetermined priority, as described hereafter with reference to FIGS. 13 to 15.

(Print Control Function)

(Outline)

FIG. 13 shows a functional structure of the image forming apparatus 100 according to Embodiment 2.

The print control unit 33 according to the present embodiment shown in FIG. 13 differs from the print control unit 33 of Embodiment 1 in that the former includes a print method determination unit 44. The print method determination unit 44 is described below.

(Selection of Print Method Based on Priority)

In Embodiment 1, the print control unit 33, based on a determination result by the printability determination unit 43, presents several print-enabling solutions to the user, so that an image forming operation can be performed based on a selected print method. In order to make this function more useful and effective from the user's point of view, the alternative solutions (i.e., print methods), such as the work memory expanding method, the lossy compression image method, and the lower resolution image method, should be presented to the user in an appropriate order.

The above methods have advantages and disadvantages. For example, the work memory expanding method requires that the external storage device 14 be usable as an expanded memory. The lossy compression image method and the lower resolution image method are associated with degradation of print quality.

Thus, the print method determination unit 44 determines print methods based on priority management data 52 (which may include predetermined rules for determining a print method) for managing the individual methods according to priority, as shown in FIG. 14, so that the individual characteristics of the alternative methods can be taken into consideration. The priority management data 52 may be set by an administrator of the image forming apparatus 100 via the UI function of the operating panel 11 and then stored in a non-volatile memory device such as the NV-RAM104 (priority information retaining unit). The priority management data 52 thus stored may be accessed via the memory managing unit 32.

As shown in FIG. 14, the priority management data 52 includes priority information indicating priority orders for presenting the individual print methods, and print condition specifying information specifying each print method. The priority information and the print condition specifying information are uniquely associated with each other. Based on such data structure, the print method determination unit 44 can present print methods to the user in order of priority and prompt the user to make a selection.

While the priority management data 52 shown in FIG. 14 is structured in table format, this is merely an example. The priority management data 52 may be in any format as long as the priority of individual print methods can be uniquely identified by the print method determination unit 44. For example, the priority management data 52 may be in a list structure where priority is given based on the order of reference to data.

In the management data 52 shown in FIG. 14, the priority information is expressed numerically and the print condition specifying information is expressed by character strings. Print methods that produce higher print quality are given higher priority.

An example is considered where the print method determination unit 44 presents the print methods based on the priority management data 52 shown in FIG. 14. The print method determination unit 44 refers to the priority information about the priority management data 52 via the memory managing unit 35, and identifies an item with highest priority, i.e., "1". Then the print method determination unit 44 refers to the print method specifying information associated with the identified item, acquiring the character string "Work memory expanding method". Based on the acquired character string, the print method determination unit 44 causes, via the operating panel control unit 35 (confirmation display unit), the corresponding print method to be displayed on the display screen 21 of the on operating panel 11.

An operation instruction received from the user via the UI function of the operating panel 11 is delivered, via the operating panel control unit 35, to the print method determination unit 44. When the received operation instruction indicates that the user agrees to one of the presented print methods, the print method determination unit 44 adopts the instructed print method. When the received operation instruction indicates that the user does not agree to any of the presented print methods, the print method determination unit 44 once again refers to the priority management data 52 and presents print methods with lower priority to the user, and waits for an operation instruction.

Thus, in the image forming apparatus 100 at the present embodiment, even when it is determined that printing is not possible due to lack of memory, the print method determination unit 44 can present plural print-enabling solutions in order or priority to the user. Thus, the image forming operation can be controlled by a print method desired by the user.

(Procedure)

With reference to FIG. 15, a description is given of a specific procedure of the print control function according to the present embodiment including the print method determination unit 44. The procedure is performed by the print control unit 33 of the controller system 30. The procedure up to and including step S703 shown in FIG. 15 is the same as the procedure up to and including step S203 shown in FIG. 8. Thus, in the following, the procedure between steps S704 and S710 alone is described.

(Print Control Procedure)

FIG. 15 shows an flowchart of the procedure according to Embodiment 2.

If it is determined by the printability determination unit 43 that the predicted memory usage A is equal to or smaller than the available memory capacity ("No" in step S703), the print control unit 33 causes the language interpretation unit 34 to generate image data that can be interpreted by the engine 13, and starts to print (step S710).

On the other hand, if the printability determination unit 43 determines that the predicted memory usage A is greater than the available memory capacity ("Yes" in step S703), the print method determination unit 44 refers to the priority management data 52, which may be stored in the NV-RAM 104 (step S704), and acquires the print method specifying information with high priority based on the priority information. The print method determination unit 44 then determines the print methods to be presented to the user based on the acquired information (step S705).

The print control unit 33 then causes, via the operating panel control unit 35, a print permission screen to be displayed on the display screen 21 of the operating panel 11, asking the user whether printing may be performed by the determined print method (step S706).

After the print permission screen is displayed, upon reception of an instruction via the operating panel control unit 35 that the user does not permit printing ("No" in step S707), the print control unit 33 determines whether all of the print methods have been presented to the user by the print method determination unit 44. If there is one or more print methods that have not been presented ("No" in step S709), the procedure returns to step S704, and the subsequent process is repeated in order of priority. Whether all of the print methods have been presented may be determined based on whether the lowest priority information in the priority management data 52 has been referenced.

If all of the print methods have been presented to the user ("Yes" in step S706), the procedure proceeds to step S710, where image data is generated by the language interpretation unit 34 based on normal print method, and printing is started (step S710).

After the print permission screen is displayed, upon reception of a print permitting instruction via the operating panel control unit 35 ("Yes" in step S707), the print control unit 33 causes the language interpretation unit 34 to generate image data based on the print method to which the user has agreed, and starts to print (step S708).

Thus, in the image forming apparatus 100 of Embodiment 2, plural print-enabling solutions can be presented to the user in order to priority, so that printing can be controlled by a print-enabling method desired by the user.

(Summary)

Thus, in the image forming apparatus 100 according to Embodiment 2, when data D stored in the external storage device 14 is printed, a memory usage A that would be required at the time of printing is predicted based on various information about the print data, such as bibliographical information or attribute information, as well as print conditions. If the predicted value A is greater than the currently available memory capacity (free space memory capacity), an alert is issued to the user and a print environment is provided where the user is allowed to select the print method to be used for the subsequent print operation.

Thus, in the image forming apparatus 100 of Embodiment 2, a potential print failure due to lack of memory (memory overflow) can be detected before starting the image forming operation (i.e., before generating the image data that can be interpreted by the engine 13). Accordingly, a disadvantageous effect (incomplete print) to the user due to print failure can be prevented.

The procedures described with reference to FIGS. 8 to 12 and FIG. 15 may be encoded into a program using a programming language adapted to an operation environment (platform) of the image forming apparatus 100 according to the various embodiments. By executing such a program in a computer, the print control function of the image forming apparatus 100 according to the foregoing embodiments may be realized. Such print control programs for the image forming apparatus 100 may be stored in a computer-readable recording medium (not shown).

The print control programs for the various foregoing embodiments recorded in the computer-readable recording medium, which may include a flexible ("floppy") disk, a compact disc (CD), a digital versatile disk (DVD), may be installed on the image forming apparatus 100 by connecting the recording medium to a drive unit (not shown) capable of reading the recording media. Furthermore, because the image forming apparatus 100 has the host I/F device 107 that can be connected to a data transmission path (not shown) such as a network, the print control program may be downloaded via a telecommunications line, such as the Internet, and then installed.

It is to be understood that the above-described embodiments are merely illustrative of some of the many specific embodiments that represent applications of the principles of the present invention. Clearly, numerous and other arrangements can be readily devised by those skilled in the art without departing from the scope of the invention.

The present application is based on the Japanese Priority Application No. 2008-012015 filed Jan. 22, 2008, the entire contents of which are hereby incorporated by reference.

What is claimed is:

1. An image forming apparatus, comprising:
   an interface configured to connect an external storage device;
   an acquisition unit configured to acquire, from information about data stored in the storage device, a parameter for calculating a memory usage at the time of printing the data;
   a coefficient retaining unit configured to retain a coefficient value for the calculation of the memory usage, in association with each file type, the coefficient value characterizing the memory usage during printing on a per-page basis for a file type;
   a calculation unit configured to calculate the memory usage by acquiring from the coefficient retaining unit the coefficient value associated with the file type for calculating the memory usage, based on information indicating the file type of the parameter acquired by the acquisition unit, and then substituting the acquired coefficient value for calculating the memory usage into a set calculating formula; and
   a control unit configured to compare the memory usage calculated by the calculation unit and an available memory capacity in the image forming apparatus at the time of printing, and configured to control an image forming operation during printing depending on a comparison result.

2. The image forming apparatus according to claim 1, wherein the calculation unit changes the set calculating formula used for calculating the memory usage depending on a print condition at the time of printing.

3. The image forming apparatus according to claim 1, wherein the acquisition unit acquires from bibliographical information and/or file attribute information about the data, information about a data size, a total number of pages, and a file type as the parameter.

4. The image forming apparatus according to claim 1, wherein the control unit controls the image forming operation so that, depending on the comparison result, a memory area of the external storage device is used as a memory area that is available during printing.

5. The image forming apparatus according to claim 1, wherein the control unit controls the image forming operation so that, depending on the comparison result, lossy-compressed image data is retained in a memory area that is available during printing.

6. The image forming apparatus according to claim 1, wherein the control unit controls the image forming operation so that, depending on the comparison result, image data with a resolution lower than a designated resolution is retained in a memory area that is available during printing.

7. The image forming apparatus according to claim 1, wherein the control unit controls the image forming operation so that, depending on the comparison result, the image forming operation is controlled by one of a plurality of print methods for controlling the image forming operation during printing that is determined based on a set rule print.

8. The image forming apparatus according to claim 7, comprising a priority information retaining unit configured to retain management data for managing plural print methods in association with an individual priority order,
wherein the control unit determines the print method based on the priority by referring to the management data retained by the priority retaining unit.

9. The image forming apparatus according to claim 1, comprising an alert display unit configured to display set information indicating a possible print failure when the memory usage calculated by the calculation unit is greater than the memory capacity available during printing.

10. The image forming apparatus according to claim 1, comprising a confirmation display unit configured to display set information asking for permission to control the image forming operation in accordance with the comparison result.

11. A print control method for reading data stored in an external storage device and printing the data using an image forming apparatus having an interface for connecting the external storage device with the image forming apparatus, the method comprising:
an acquiring step of acquiring, from information about data stored in the storage device, a parameter for calculating a memory usage at a time of printing the data;
a retaining step of retaining a coefficient value for the calculation of the memory usage, in association with each file type, the coefficient value characterizing the memory usage during printing on a per-page basis for a file type;
a calculating step of calculating the memory usage by acquiring the coefficient value associated with the file type for calculating the memory usage, based on information indicating the file type of the parameter acquired by the acquisition unit, and then substituting the acquired coefficient value for calculating the memory usage into a set calculating formula; and
a control step of comparing the memory usage calculated in the calculating step with a memory capacity available in the image forming apparatus during printing, and controlling an image forming operation during printing based on a comparison result.

12. A non-transitory computer-readable recording medium storing a print control program for reading data stored in an external storage device and printing the data using an image forming apparatus having an interface for connecting the external storage device with the image forming apparatus,
wherein execution of a computer-readable program by one or more processors of an information processing apparatus causes the one or more processors to perform:
an acquiring step of acquiring, from information about data stored in the storage device, a parameter for calculating a memory usage at a time of printing the data;
a retaining step of retaining a coefficient value for the calculation of the memory usage, in association with each file type, the coefficient value characterizing the memory usage during printing on a per-page basis for a file type;
a calculating step of calculating the memory usage by acquiring the coefficient value associated with the file type for calculating the memory usage, based on information indicating the file type of the parameter acquired by the acquisition unit, and then substituting the acquired coefficient value for calculating the memory usage into a set calculating formula; and
a control step of comparing the memory usage calculated in the calculating step with a memory capacity available in the image forming apparatus during printing, and controlling an image forming operation during printing based on a comparison result.

* * * * *